US012677731B2

(12) United States Patent
Fortkamp

(10) Patent No.: US 12,677,731 B2
(45) Date of Patent: Jul. 14, 2026

(54) SYSTEMS, METHODS AND APPARATUSES FOR LIQUID MANURE SPREADING

(71) Applicant: Gregory John Fortkamp, Fort Recovery, OH (US)

(72) Inventor: Gregory John Fortkamp, Fort Recovery, OH (US)

( * ) Notice: Subject to any disclaimer, the term of this patent is extended or adjusted under 35 U.S.C. 154(b) by 600 days.

(21) Appl. No.: 18/024,041

(22) PCT Filed: Sep. 1, 2021

(86) PCT No.: PCT/US2021/048707
§ 371 (c)(1),
(2) Date: Feb. 28, 2023

(87) PCT Pub. No.: WO2022/051393
PCT Pub. Date: Mar. 10, 2022

(65) Prior Publication Data
US 2023/0263089 A1    Aug. 24, 2023

Related U.S. Application Data

(60) Provisional application No. 63/073,856, filed on Sep. 2, 2020.

(51) Int. Cl.
*A01C 23/00*        (2006.01)
*A01C 23/02*        (2006.01)
(52) U.S. Cl.
CPC .......... *A01C 23/003* (2013.01); *A01C 23/008* (2013.01); *A01C 23/021* (2013.01)

(58) Field of Classification Search
CPC ... A01C 23/003; A01C 23/023; A01C 23/008; A01C 23/021; A01C 15/00; A01C 15/18; A01M 7/0075; A01M 7/0042; A01M 7/0053; A01M 7/0014; A01M 7/006
See application file for complete search history.

(56) References Cited

U.S. PATENT DOCUMENTS

| | | | | | |
|---|---|---|---|---|---|
| 4,186,881 A | * | 2/1980 | Long | ..................... | A01G 25/095 |
| | | | | | 137/355.19 |
| 5,271,567 A | * | 12/1993 | Bauer | .................. | A01C 23/022 |
| | | | | | 137/561 A |
| 2019/0174671 A1 | * | 6/2019 | Alig | ..................... | A01C 23/022 |

FOREIGN PATENT DOCUMENTS

| | | | | | |
|---|---|---|---|---|---|
| KR | 20150100035 | * | 9/2015 | ............. | A01C 23/00 |

* cited by examiner

*Primary Examiner* — Christopher R Dandridge
(74) *Attorney, Agent, or Firm* — Frost Brown Todd LLP

(57)        ABSTRACT

Disclosed is a liquid nutrient spreader and liquid nutrient spreader system. The liquid nutrient spreader system can include a spreader unit that can be moved in a direction of movement by a mover, which can be a tractor. The spreader unit can be mobile, being supported on the ground by wheels or tracks. The spreader unit can include a frame that supports a hose reel onto which is reeled a supply hose. The supply hose provides for fluid communication of liquid nutrients between a liquid nutrient storage unit to a fluid distributor, and eventually to a one or more of a plurality of injectors mounted to an incorporation toolbar.

20 Claims, 17 Drawing Sheets

252

Liquid Nutrient Storage

Pump
254

212

Supply Hose

Hose Unwind and
Rewind Path

The white line is the hose spooling &
un-spooling path. The dashed line is
the tractor driving path.
The application starts in the center of
the field and works to the right, then
stops and returns to center and
resumes working to the left side of
the field.

2680'

1320'

SYSTEMS, METHODS AND APPARATUSES FOR LIQUID MANURE SPREADING

REFERENCE TO RELATED APPLICATIONS

The present application claims the priority benefit of International Patent Application No. PCT/US21/48707 filed Sep. 1, 2021, which itself claims the benefit U.S. provisional patent application Ser. No. 63/073,856, filed Sep. 2, 2020, and hereby incorporates the same applications herein by reference in their entireties.

TECHNICAL FIELD

Embodiments of the technology relate, in general, to systems, apparatuses and methods for liquid nutrient spreading.

BACKGROUND

The majority of liquid nutrients in the form of manure is currently applied in a three-month window in the fall of the year. Those liquid nutrients then get saturated by winter snow and spring rains and have a high probability of becoming mobile and leaving the as-applied field. These nutrients run off and enter the Waters of the State. In some instances a smaller percentage of liquid nutrients is applied in the spring, and this provides a significant reduction in the amount of nutrients that become mobile, entering the waters. However, the spring is when the crops need to get planted, and the window of time for planting seems to be getting smaller every year.

Ideally, to minimize liquid nutrient loss to run off, liquid nutrients should be applied to a growing crop. However, liquid nutrient applicators, including manure pumpers, traditionally apply liquid nutrients through a process called drag lining. In this process, liquid nutrients are applied through a hose that is simply dragged across the field. This isn't desirable with a growing crop, as the moving hose will crush and snap off the crop at the ground level, killing it.

DETAILED DESCRIPTION

Figure 1:
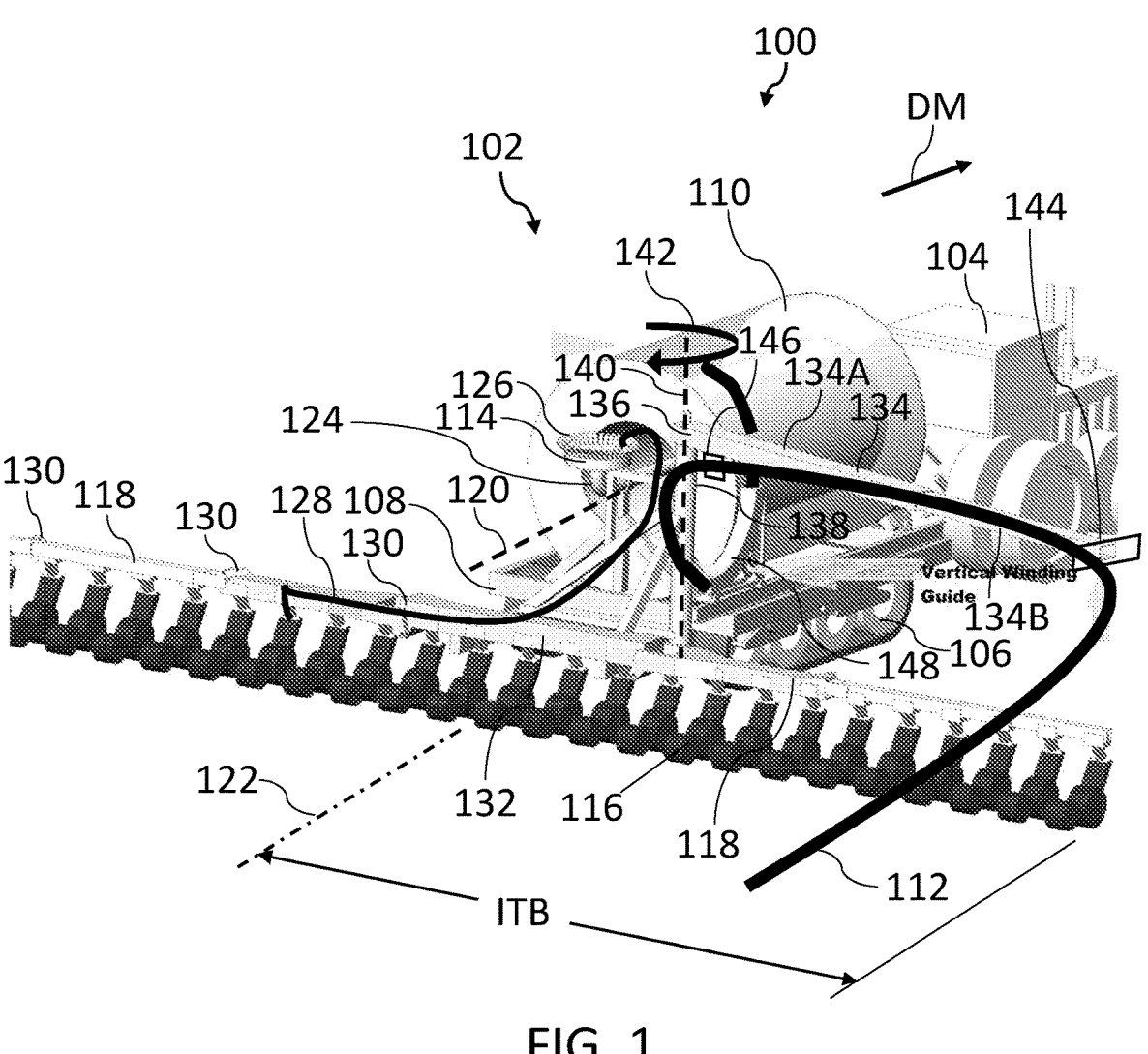
FIG. 1 is a perspective view of a system and apparatus for liquid nutrient spreading.

Certain embodiments are hereinafter described in detail in connection with the views and examples of FIGS. 1-17.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Technical solutions to enhance liquid nutrient spreading can be achieved by the systems, apparatuses and methods of the present disclosure. The disclosed systems, apparatuses and methods achieve improvements to spreading liquid nutrients with greatly increased efficiency and spreading capability.

In general, the disclosed apparatuses can be used to spread, inject, or otherwise distribute any fluid supplied to the apparatus according to the systems and methods of the disclosure. Thus, although the disclosure is largely limited to liquid nutrient spreading on crops and fields, the invention is not to be limited only to liquid nutrient spreading applications. In general, liquid nutrients can include fertilizers. Liquid nutrients can be obtained from manure, and in embodiments, the apparatus of the system can be utilized to spread liquid manure.

Referring to FIG. 1, there is shown a liquid nutrient spreader system 100. The liquid nutrient spreader system 100 can include a spreader unit 102 that can be moved in a direction of movement DM by a mover 104, which can be a tractor. Thus, in general, a liquid nutrient spreader system 100 can include a tractor pulled spreader unit 102. To aid in being pulled, the spreader unit can be mobile, being supported on the ground by wheels or, as shown, tracks 106. The tracks 106 can be continuous tracks in a continuous track is a system. A continuous track of the type used in tracked vehicles can comprise a continuous band of treads or track plates driven by two or more wheels. The large surface area of the tracks distributes the weight of the vehicle better than steel or rubber tires on an equivalent vehicle, enabling continuous tracked vehicles to traverse soft ground with less likelihood of becoming stuck due to sinking. The tracks 106 can be sized and spaced apart a distance to eliminate or minimize crop damage. That is, the tracks 106 can be sized to operate in the space between a line of furrows or crops, and two parallel tracks 106 can be spaced apart such that each track operates in the spacing between furrows or crops. It is understood, however, that in some embodiments the spreader unit 102 (or other spreader unit embodiments shown and described herein) can be motorized itself, i.e., not need a separate mover (e.g., mover 104). In other words, the spreader unit may include an integral mover (e.g., a tractor) to form a single unit rather than two separate units.

The spreader unit 102 can comprise a frame 108 that supports a hose reel 110 onto which is reeled a supply hose 112. The supply hose 112 provides for fluid communication of liquid nutrients between a liquid nutrient storage unit, as discussed below, to a fluid distributor 114, and eventually to a one or more of a plurality of injectors 116 mounted to an incorporation toolbar 118. The incorporation toolbar 118 can be mounted to the frame 108 and can be positioned to extend away from the frame 108. The incorporation toolbar 118 can be mounted to the frame 108 rigidly or with one or more moveable joints, including hydraulic connections, such that the incorporation toolbar 118 can be urged downwardly, toward the ground, with the downward pressure causing one or more of the plurality of injectors 116 to also be directed closer to the ground, including in an embodiment, penetrating the ground. In an embodiment, one or more of the plurality of injectors 116 are each aligned with a ground-disrupting blade such that the liquid is injected into a trench, which can then be covered, as more fully described below. The supply hose 112 can be any diameter such as, for example, from six to twelve inches in diameter, and can provide for a variety of flows such as, for example, a flow of up to 8000 gallons per minute or more. In an embodiment, the supply hose 112 can be a "hard" hose that does not collapse when empty. In an embodiment, the supply hose 112 can be a "soft" hose, or a "lay flat" hose. Under operating pressure, the lay flat hose maintains a generally round cross-sectional shape, but can lay flat for a lower profile when not being used to flow liquid nutrient. The supply hose 112 can have a length generally between 1320 and 5280 feet, and/or can have a length predetermined for the intended area of coverage. It is believed that a hose length of about 2000 feet permits coverage of an 80 acre field, including a field with parallel rows of a growing crop, or up to a 160 acre barren field, in which the spreader unit and supply hose can be used diagonally in the field, without danger of harming growing crops.

The hose reel 110 rotates about a reel axis 120 to reel in or to reel out the supply hose 112. The reel axis 120 can be oriented to be parallel to the direction of movement DM of the spreader unit, which in the illustrated embodiment is substantially parallel to the orientation of a longitudinal centerline of the tracks 106. In an embodiment, the hose reel 110 is powered by a hose reel motor, with rotation being controlled to reel in or reel out the supply hose with movement of the spreader unit during operation. The incorporation toolbar 118 can be mounted generally parallel to the ground, and can extend laterally on each side a toolbar distance ITB from a centerline 122 of the spreader unit 102, which can be aligned with the reel axis 120. In an embodiment, the centerline 122 and the reel axis 120 are parallel and co-planar.

The incorporation toolbar 118 can be comprised of moveable sections, each section being articulated about one or more toolbar joints 130, three of which are indicated in FIG. 1 on the left lateral arm of the incorporation toolbar 118. The number and placement of toolbar joints 130 can permit the toolbar sections to be folded, rotated, or otherwise manipulated to minimize the outward extension of the toolbar during transport of the spreader unit 102, as shown in more detail below.

In an embodiment, a central portion 132 of the incorporation toolbar 118 can be joined by a toolbar joint 130 on each end to one or more segments of the lateral extensions of the incorporation toolbar 118. The central portion 132 can be disposed behind and centered on the frame 108. In an embodiment, the incorporation toolbar 118 can have a total length that is two times the toolbar distance ITB, and can have a length sufficient to span from 20 to 30 rows of growing crop. In an embodiment, the incorporation toolbar 118 can have a length sufficient to span 24 or more rows of growing crop. It is understood, however, that incorporation toolbar 118 can have any length as desired or necessary.

A hose boom 134 is mounted at a proximal end 136 to a boom mount 138 that is joined to the frame 108. The boom mount 138 can be generally vertically oriented, having a boom mount axis 140 that can be generally perpendicular to the reel axis 120 and/or the ground. In an embodiment, the hose boom 134 can be movably joined to the boom mount 138, such that the hose boom 134 can rotate about the boom mount axis 140, as indicated by the arrow 142. The hose boom 134 can have multiple, extendable and/or pivotable knuckle segments, including telescoping segments, such that the length of the hose boom 134 can be variable, and can be changed by system controls as desired. For example, as shown in FIG. 1, the hose boom 134 can have a first hose boom segment 134A and a second hose boom segment 134B, the first and second hose boom segments being telescoping for variable length. In an embodiment, first and second boom segments can be rotatable, and/or pivotable, and/or foldable to provide for varying length and/or shape of the hose boom 134.

The boom mount 138 can be mounted in a position offset from a central area of the frame 108. For example, the boom mount 138 can be mounted a distance to one side of the frame 108 and separated a distance from, for example, the reel axis 120. By configuring the boom mount 138 to the side of the hose reel 110, the path of the reeling supply hose 112 can be placed in alignment with a hose reel guide 148. The hose boom 134, the boom mount 138, and other portions of the frame 108 can have various rollers, guides, hooks, loops, and the like for guiding, managing, and generally handling the supply hose 112 during operation of the spreader unit 102. For example, a first supply hose guide 144 at or near a distal end of the hose boom 134 can guide the supply hose 112 from a position in the field onto the hose boom 134 and directionally oriented toward the boom mount 138. The first supply hose guide 144 can be one or more rollers configured to provide for a relatively smooth, low-friction engagement with the hose boom 134. In an embodiment, the first supply hose guide 144 includes one or more driven rollers, including, for example, driven wheels or tires, that not only help guide the supply hose 112, but also drive the supply hose 112 toward or away (depending on the direction of movement DM in relation to a liquid nutrient storage unit, as discussed below) from the boom mount 138. An optional second supply hose guide 146 can manage the supply hose 112 as it transitions from the hose boom 134 to the hose reel guide 148. The hose reel guide 148 guides the supply hose 112 onto or off of the hose reel 110 and can be driven in a forward or reverse direction (e.g., parallel with the direction of movement DM) with rotation of the hose reel 110 to achieve a smooth, orderly winding or unwinding of the supply hose 112 onto the hose reel 110.

The supply hose 112 can be wound about the hose reel 110 and connected to a swivel joint that connects to a fluid tube 124 in fluid communication with the hose reel 110 that extends to a fluid distributor 114. The fluid tube 124 can be disposed externally or internally to the hose reel. The fluid tube 124 can be a non-rotating, fixed tube, fixed to the frame 108. The fluid distributor 114 includes a connection to the fluid tube 124 and a plurality of injector hose connections 126. An injector hose 128 provides for fluid communication from the injector hose connection 126 to an injector 116. In operation a plurality of injector hoses 128 connect one or more of the injector hose connections 126 to one or more injectors 116, as shown below, but only one injector hose 128 is shown in FIG. 1 for clarity. Thus, in operation, liquid nutrients can flow from the supply hose 112 to the fluid distributor 114, and through one or more injector hoses 128 to an injector 116, and then onto and/or into the ground.

Figure 2:
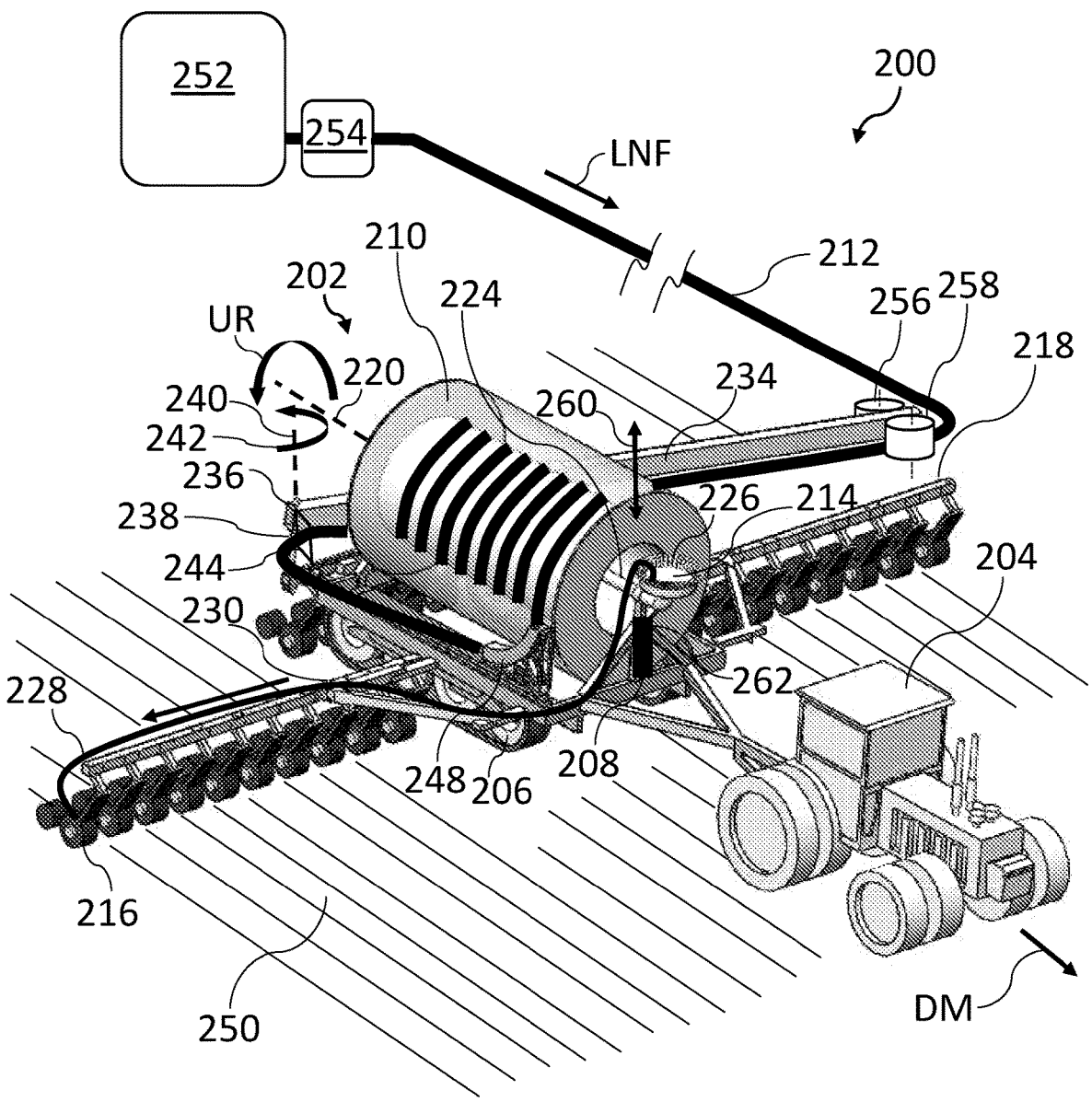
FIG. 2 is a perspective view of a system and apparatus for liquid nutrient spreading.

Referring now to FIG. 2, there is shown another example of a liquid nutrient spreader system 200. The main difference between the liquid nutrient spreader system 100 shown in FIG. 1 and the liquid nutrient spreader system 200 shown in FIG. 2 is the configuration of the incorporation toolbar 218. Whereas in the embodiment of FIG. 1 the entire incorporation toolbar 118 is operationally disposed to the rear of the spreader unit 102, in the embodiment of FIG. 2 portions of the incorporation toolbar 218 are operationally disposed at a mid-portion of the spreader unit 202, referred to a "mid-mount" configuration. That is, as indicated in the example top view of FIG. 3, a central portion 232 of the incorporation toolbar 218 can be joined to a rear portion of the spreader unit 202, and the lateral extensions of the incorporation toolbar 218 can extend outwardly from the spreader unit 202 near a mid-portion thereof. Thus, a first lateral extension 218A can extend to the left side of the spreader unit 202, and a second lateral extension 218B can extend to the right side of the spreader unit 202. That is, portions of an incorporation toolbar 218 can be mounted intermediate to a forward end and a rearward end of the spreader unit 202. In this manner, the forces exerted on the connection to the mover 204, such as a tractor, by the weight of the spreader unit, including any downward pressure exerted on the injectors 216, can be different, and can be lower. One advantage of a mid-mount configuration is that with down pressure exerted on the incorporation toolbar 218 to get a desired depth of the injectors 216, the weight on the tracks 206 is reduced, and, therefore, there is reduced pressure and compaction on the ground.

Figure 3:
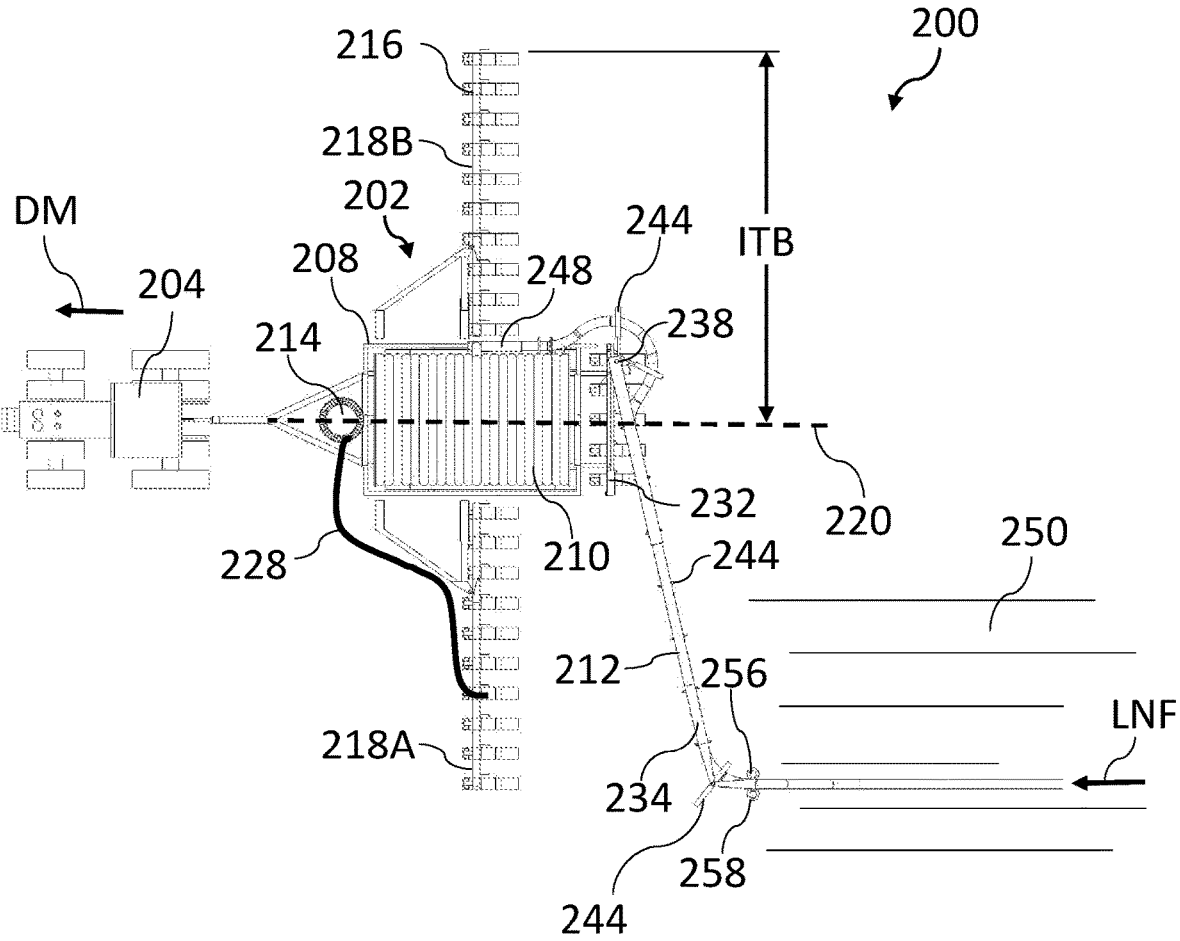
FIG. 3 is a plan view of a system and apparatus for liquid nutrient spreading.

In other respects, the liquid nutrient spreader system 200 shown in FIGS. 2 and 3 can have the same components as the liquid nutrient spreader system 100, as indicated in the description below. However, other features beneficial to both the liquid nutrient spreader system 100 and the liquid nutrient spreader system 200 are additionally described with respect to the liquid nutrient spreader system 200. The liquid nutrient spreader system 200 can include a spreader unit 202 that can be moved in a direction as indicated by the arrow indicating a direction of movement DM by a mover 204, which can be a tractor. Thus, in general, the liquid nutrient spreader system 200 can include a tractor pulled spreader unit 202. To aid in being pulled, the spreader unit can be mobile, being supported on the ground by wheels or, as shown, tracks 206. The tracks 206 can be sized and spaced apart a distance to eliminate or minimize crop damage. That is, the tracks 206 can be sized to operate in the space between a line of furrows 250 or crops, and two or more parallel or in-line tracks can be spaced apart such that each track operates in the spacing between furrows 250 or crops.

The spreader unit 202 can comprise a frame 208 that supports a hose reel 210 onto which is reeled a supply hose 212. The supply hose 212 provides for fluid communication of liquid nutrients from a liquid nutrient storage unit 252. Liquid nutrients can be pumped by a pump 254 into the supply hose 212 in a fluid flow direction indicated by the arrow LNF. Liquid nutrients flow through supply hose 212 to a fluid distributor 214, and eventually to a one or more of a plurality of injectors 216 mounted to an incorporation toolbar 218. The incorporation toolbar 218, or individual portions thereof, can be mounted to the frame 208 with moveable joints, including hydraulic connections, such that the incorporation toolbar 218 can be urged downwardly, toward the ground, with the downward pressure causing one or more of the plurality of injectors 216 to penetrate the ground. In an embodiment, one or more of the plurality of injectors 216 are each aligned with a ground-disrupting blade such that the liquid is injected into a trench, which can then be covered as more fully described below.

The hose reel 210 rotates about a reel axis 220, for example in the direction of arrow UR for an unwind rotation, to reel in or to reel out the supply hose 112. The reel axis 220 can be oriented to be parallel to the direction of movement DM of the spreader unit, which in the illustrated embodiment is substantially parallel to the orientation of the furrows 250. In an embodiment, the hose reel 210 is powered by a hose reel motor, with rotation being controlled to reel in or reel out the supply hose 212 with movement of the spreader unit during operation. The incorporation toolbar 218, including the central portion and the lateral extensions, can be mounted generally parallel to the ground, and can extend laterally a toolbar distance ITB from a centerline 222 of the spreader unit 202, which can be aligned with the reel axis 220 on each side of the spreader unit, as indicated in FIG. 3, which is a top, plan view of the liquid nutrient spreader system 200 shown in FIG. 2. The incorporation toolbar 218 can be comprised of moveable sections, each section being articulated about one or more toolbar joints 230, one of which is indicated in FIG. 2 for one of the lateral extensions of the incorporation toolbar 218. The number and placement of toolbar joints 230 can permit the toolbar sections to be folded, rotated, or otherwise manipulated to minimize the outward extension of the incorporation toolbar 218 during transport of the spreader unit 202.

A hose boom 234 is mounted at a proximal end 236 to a boom mount 238 that is joined to the frame 208. The boom mount 238 can be generally vertically oriented, having a boom mount axis 240 that can be generally perpendicular to the reel axis 120 and/or the ground. In an embodiment, the hose boom 234 can be movably joined to the boom mount 238, such that the hose boom 234 can rotate about the boom mount axis 240, as indicated by the arrow 242. The hose boom 234 can have multiple, extendable segments, including telescoping segments, such that the length of the hose boom 234 can be variable, and can be changed by system controls as desired.

The boom mount 238 can be mounted in a position offset from a central area of the frame 208. For example, the boom mount 238 can be mounted a distance to one side of the frame 208 and separated a distance from, for example, the reel axis 220. As depicted in FIG. 3, for example, the offset configuration of the boom mount 238 can facilitate efficient supply hose routing to the hose reel winding guide 248. The hose boom 234, the boom mount 238, and other portions of the frame 208 can have various rollers, guides, hooks, loops, and the like for guiding, managing, and generally handling the supply hose 212 during operation of the spreader unit 202. For example, a pair of opposing guide rollers can be positioned to both grip and/or drive the supply hose 212 toward or away from the hose reel 210. As indicated, for example, a first guide roller 256 and a second guide roller 258 can be mounted at or near the distal end of the hose boom 234. The first guide roller 256 and the second guide roller 258 can rotate about generally parallel axes of rotation, and can have a size, diameter, shape, and material that serve to handle the directional change of the supply hose 212 at or near the distal end of hose boom 234. Thus, the first guide roller 256 and a second guide roller 258 can guide the supply hose 212 from a position in the field generally parallel to furrows 250 and onto the hose boom 234 and directionally oriented toward the boom mount 238. The first and second guide rollers are beneficial when crossing the middle of the field, at which point the hose boom and hose travel perpendicularly across to the opposite end of the incorporation toolbar. Once the opposite side is reached, the hose must make as sharp of a 90-degree turn as possible and begin being laid in between the parallel rows of growing crops as the apparatus is continues being pulled to the end of the field. It is believed that without the first and second guide rollers, which can act as hose lay drive assist wheels, during this maneuver the hose can be laid out in a very large radius bend. In the process it may be drug across a growing crop, causing serious harm and potentially killing it. By powering the wheels which are squeezing the hose, it will be forced out the end of the boom without being drug across the crop, and make a sharp bend.

Additional supply hose guides, such as guide 244 at the proximal end of the hose boom 234 can be one or more rollers configured to provide for a relatively smooth, low-friction engagement with the hose boom 234 and can manage the supply hose 212 as it transitions from the hose boom 234 to a hose reel winding guide 248. Hose reel winding guide 248 guides the supply hose 212 onto or off of the hose reel 210 and can be driven in a forward or reverse direction (e.g., parallel with the movement direction DM) with rotation of the hose reel 210 to achieve a smooth, orderly winding or unwinding of the supply hose 212 onto the hose reel 210.

The supply hose 212 can be wound about the hose reel 210 and connected to a swivel joint that connects to a fluid tube 224 that extends interior to the hose reel 210 that and extends to a fluid distributor 214. The fluid tube 224 can be a non-rotating, fixed tube, fixed to the frame 208. The fluid distributor 214 includes a connection to the fluid tube 224 and a plurality of injector hose connections 226. An injector hose 228 connects the injector hose connection 226 to an injector 216. In operation a plurality of injector hoses 228 connect one or more of the injector hose connections 226 to one or more injectors 216, but only one injector hose 228 is shown in FIG. 2 for clarity. Thus, in operation, liquid nutrients can flow LNF from the supply hose 212 to the fluid distributor 214, and through one or more injector hoses 228 to one or more injectors 216, and then into the ground.

The hose reel 210 (and the hose reel 110 as described in the liquid nutrient spreader system 100 above) can be adjustably moveable up and down, and indicated by the arrow 260 in FIG. 2. Vertical up or down movement of the hose reel 210 can be effectuated by, for example, a hydraulic piston member 262 mounted to a portion of the frame 208. Thus, the frame 208 can have a size and shape to accommodate a portion of the hose reel 210 in a lowered position, which is advantageous for lowering the overall height of the spreader unit 202 for transport. However, during operation, the hose reel 210 can be elevated to an operational level. In an embodiment, in a lowered position, the highest portion of the hose reel 210 can be less than 13 feet, six inches. In an embodiment, in a raised position, the highest portion of the hose reel 210 can be about 16 feet from the ground, thereby providing room for the tracks and winding guide to work more properly.

Additionally to the disclosure above, the hose boom can be made of tubes with sequentially smaller diameters that are able to be slide inside one another to allow telescoping motion. The entire hose boom can also pivot around an axis giving rotation to allow it to swing from side to side, and thereby to one end or the other of the incorporation toolbar. While driving, the supply hose can dispense off of the reel and down the telescoping boom rotated to either the far left, or the far right of the incorporation toolbar that is attached to the supply unit. The hose boom can be offset from center to be placed closer to the hose reel winding guide. The hose reel winding guide can be hinged so that it "leans" toward or away from the hose real to self-align with whatever wrap layer is currently being spooled, or un-spooled from the hose reel. By positioning the hose reel winding guide substantially upright, it takes up a small amount of horizontal space to maintain as narrow as possible of a profile for road transport, without the added complexity of folding it.

Figure 4:
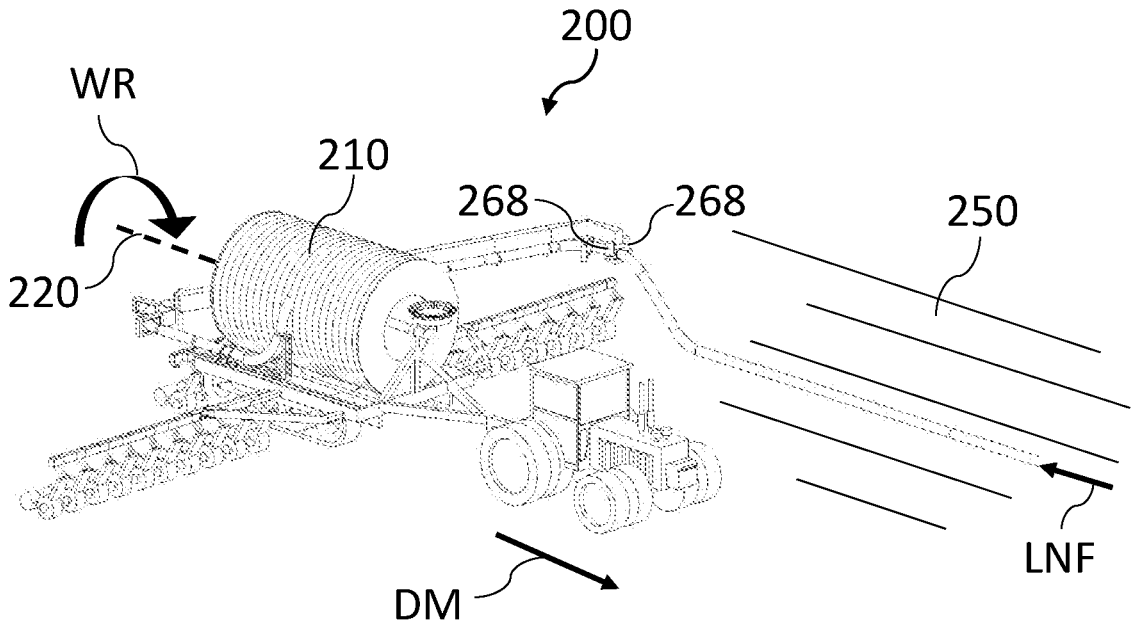
FIG. 4 is a perspective view of a system and apparatus for liquid nutrient spreading.

FIG. 4 shows a representative liquid nutrient spreader system 200 in which the hose reel 210 winds in a winding rotation WR about reel axis 220 when the direction of movement DM is generally opposite the direction of liquid nutrient flow LNF.

Figure 5:
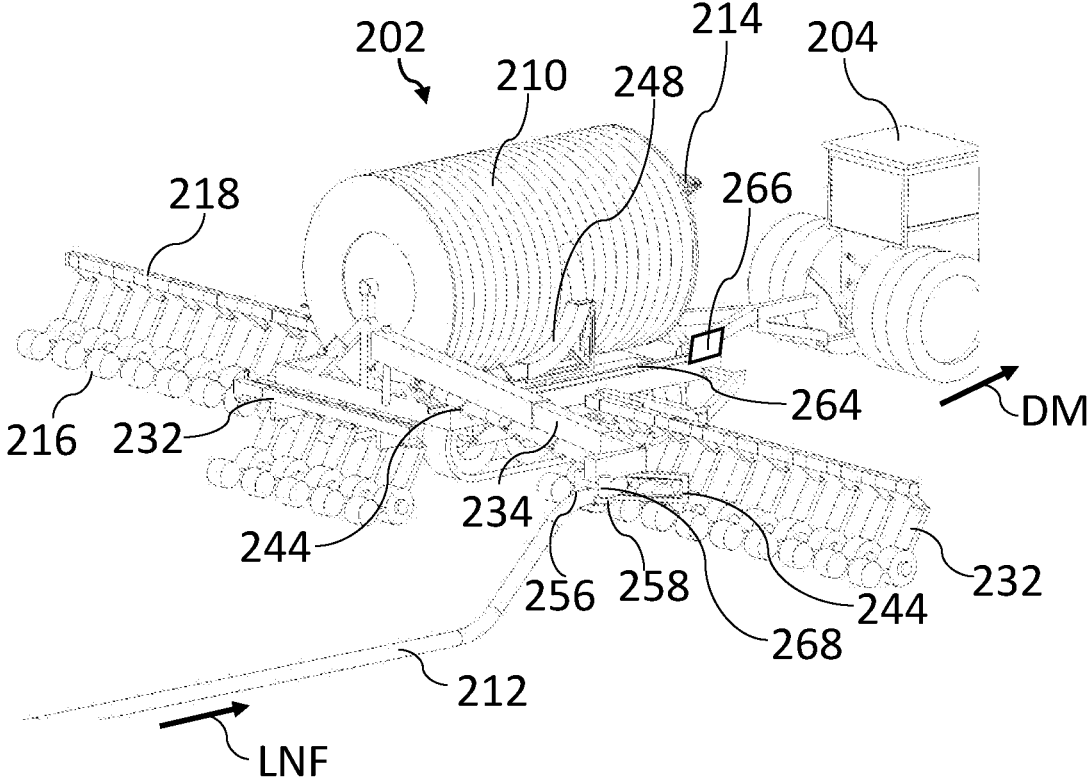
FIG. 5 is a perspective view of a system and apparatus for liquid nutrient spreading.
Figure 6:
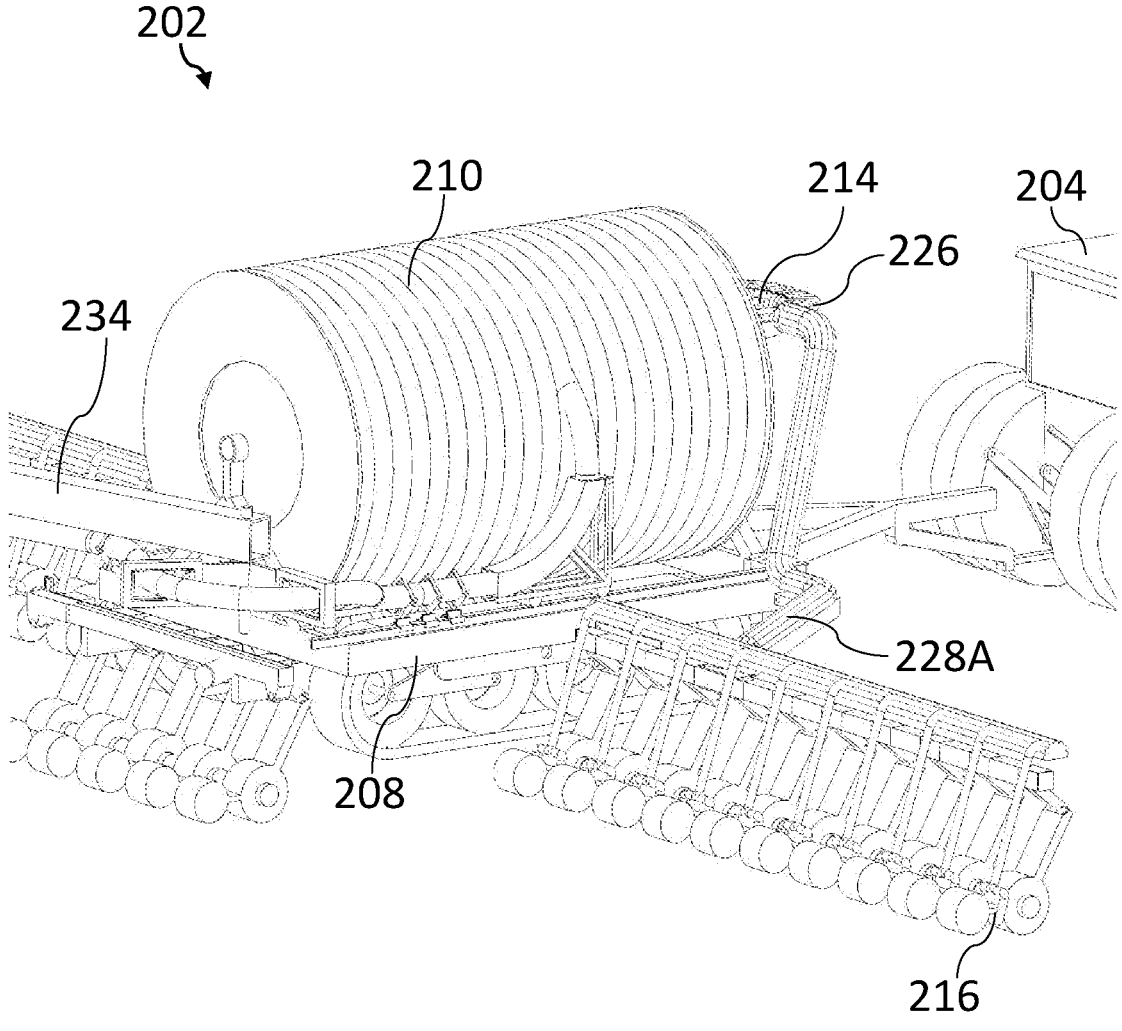
FIG. 6 is a perspective view of a portion of a system and apparatus for liquid nutrient spreading.
Figure 7:
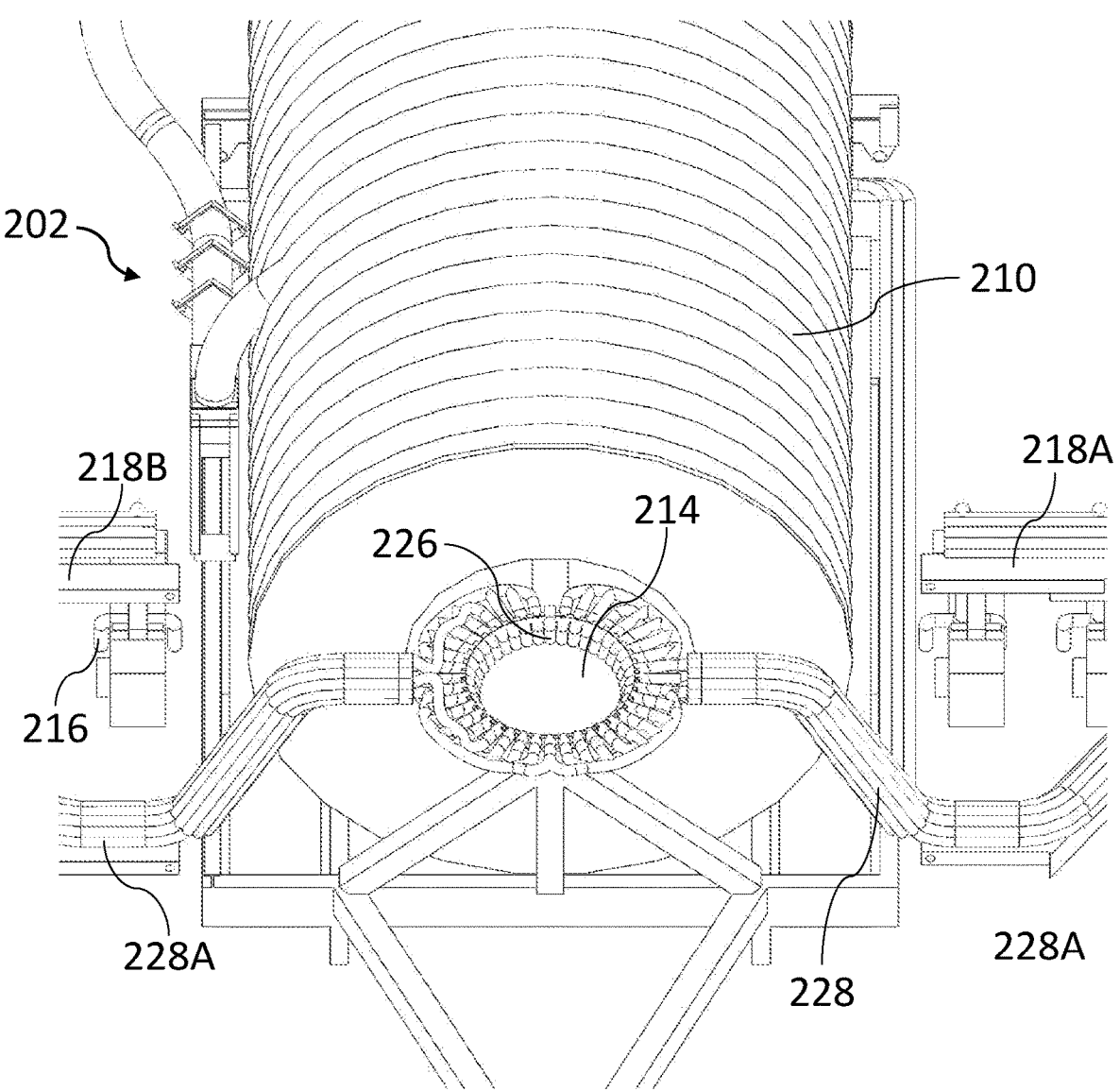
FIG. 7 is a perspective view of a portion of a system and apparatus for liquid nutrient spreading.

Referring to FIGS. 5-7 there are shown additional details for a liquid nutrient spreader system 200. The illustrated details are depicted for the "mid-mount" configuration, but can be equally useful in other configurations. Representative supply hose guides, such as guide 244 at the proximal end of a telescoping hose boom 234 can include, or be in addition to, one or more rollers, such as the above-mentioned first guide roller 256 and the second guide roller 258. One or both (or any of all guide rollers) can be controlled by a guide roller motor 268 that can drive, brake, or otherwise manage the rotation of the controlled guide roller to provide for a relatively smooth, low-friction engagement of the supply hose 212 with the hose boom 234 and other components. Other representative guides 244 can be operatively disposed on the hose boom 234 and can manage the supply hose 212 as it transitions from the hose boom 234 to a hose reel winding guide 248. The hose reel winding guide 248 can be mounted on a translatable surface, such as a track 264, on which the hose reel winding guide 248 can traverse. The hose reel winding guide 248 can be shaped to conform the supply hose from a generally non-vertically disposed orientation as it leaves the hose boom 234 to a generally vertically disposed orientation at it reels onto or off of the hose reel 210. As the supply hose 212 reels on to or off of the hose reel 210, the hose reel winding guide 248 can traverse on the track 264 so that the supply hose 212 can wind on to or off of the hose reel 210 in a smooth, orderly manner. In an embodiment, the hose reel winding guide 248 can traverse on the track 264 in a linear orientation. In an embodiment, hose reel winding guide 248 can be driven by a track drive motor 266 and controlled to traverse on the track 264 in a linear orientation, back and forth as desired to reel in or out the supply hose 212.

Now referring more particularly to FIGS. 6 and 7, there is shown in more detail a representative example of a fluid path from the fluid distributor 214, through injector hoses 228 to an injector 216. As shown, a plurality of injector hoses 228 can be each connected to the fluid distributor by a hose connection 226, and then routed to one or more injectors (e.g., an injector 216). A plurality of injector hoses 228 can be bundled to be efficiently routed as an injector hose bundle 228A, with each injector hose 228 hose originating at the fluid distributor 214 and each in turn diverting to an injector 216. In an embodiment, as shown in FIG. 7, two injector hose bundles 228A can originate at the fluid distributor 214 and be configured to flow in opposing directions, one to the first lateral extension 218A on the left side of the spreader unit 202, and a second lateral extension 218B can extend to the right side of the spreader unit 202.

Alternatively, in an embodiment, a plurality of injector hoses 228 can connect to the fluid distributor via a fluid distributor manifold (not shown). In general, at least one injector hose connects to the fluid distributor manifold at a hose connection 226, and provides fluid communication to at least one injector 216. A plurality of injector hoses 228 can be bundled to be efficiently routed as an injector hose bundle 228A, with each injector hose 228 hose originating at the fluid distributor manifold and each in turn diverting to an injector 216. As with the embodiment shown in FIG. 7, two injector hose bundles 228A can originate at the fluid distributor manifold and be configured to flow in opposing directions, one to the first lateral extension 218A on the left side of the spreader unit 202, and a second lateral extension 218B can extend to the right side of the spreader unit 202.

Figure 8:
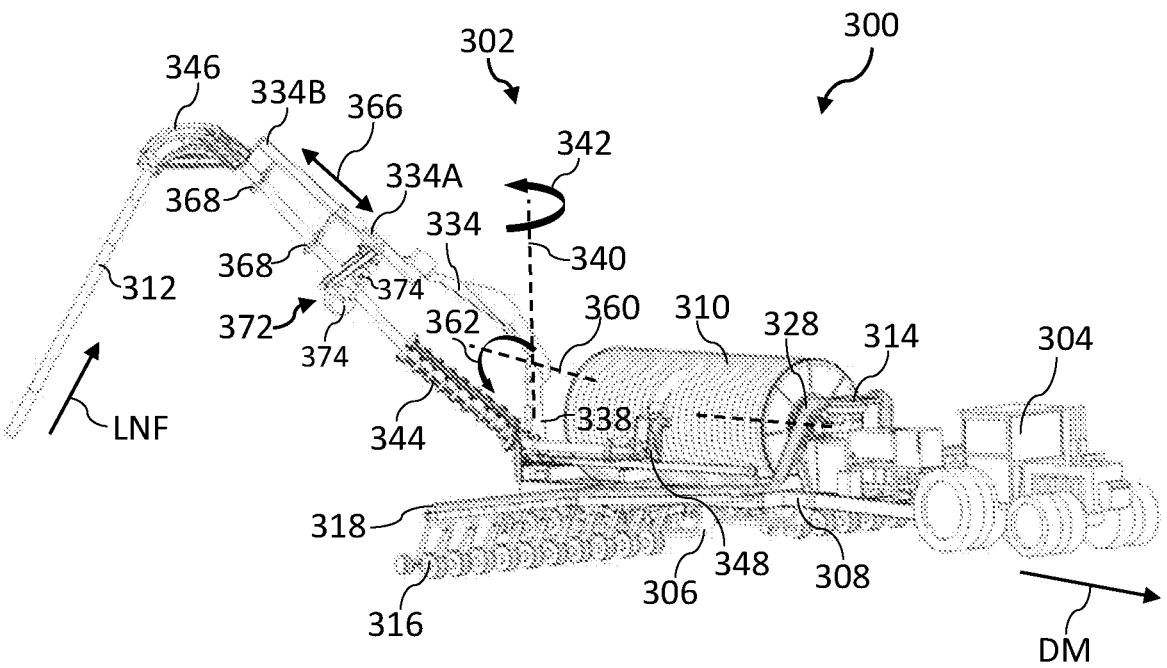
FIG. 8 is a perspective view of a portion of a system and apparatus for liquid nutrient spreading.

Referring now to FIG. 8, there is shown another example of a liquid nutrient spreader system 300. The liquid nutrient spreader system 300 can have any and all of the structure, function and benefits described above with respect to the liquid nutrient spreader system 100 shown in FIG. 1 or the liquid nutrient spreader system 200 shown in FIG. 2. One difference notable for the liquid nutrient spreader system 300 is the configuration of the hose boom 334. Whereas in the embodiment of FIG. 1 the hose boom 134 can be movably joined to the boom mount 338, such that the hose boom 334 can rotate about a primary boom mount axis 340, as indicated by the arrow 342, the hose boom 334 of the liquid nutrient spreader system 300 can be rotated about multiple axes, giving additional degrees of freedom to the movement of the supply hose 312. The toolbar 318 of the liquid nutrient spreader system 300 can be either disposed to the rear of the spreader unit as depicted for liquid nutrient spreader system 100 or a "mid-mount" configuration as depicted in the embodiment of liquid nutrient spreader system 200.

In other respects, the liquid nutrient spreader system 300 shown in FIGS. 8-11 can have the same components as the liquid nutrient spreader system 100 or the liquid nutrient spreader system 200. However, other features beneficial to both the liquid nutrient spreader system 100 and the liquid nutrient spreader system 200 are additionally described with respect to the liquid nutrient spreader system 300. The liquid nutrient spreader system 300 can include a spreader unit 302 that can be moved in a direction as indicated by the arrow indicating a direction of movement DM by a mover 304, which can be a tractor. Thus, in general, the liquid nutrient spreader system 300 can include a tractor pulled spreader unit 302. To aid in being pulled, the spreader unit can be mobile, being supported on the ground by wheels or, as shown, tracks 306. The tracks 306 can be sized and spaced apart a distance to eliminate or minimize crop damage. That is, the tracks 306 can be sized to operate in the space between a line of furrows or crops, and two or more parallel or in-line tracks can be spaced apart such that each track operates in the spacing between furrows or crops.

The spreader unit 302 can comprise a frame 308 that supports a hose reel 310 onto which is reeled a supply hose 312. The supply hose 312 provides for fluid communication of liquid nutrients from a liquid nutrient storage unit, as discussed above. Liquid nutrients can be pumped by a pump into the supply hose 312 in a fluid flow direction indicated by the arrow LNF. Liquid nutrients flow through supply hose 312 to a fluid distributor 314, and eventually to a one or more of a plurality of injectors 316 mounted to an incorporation toolbar 318. The incorporation toolbar 318, or individual portions thereof, can be mounted to the frame 308 with moveable joints, including hydraulic connections, such that the incorporation toolbar 318 can be urged downwardly, toward the ground, with the downward pressure causing one or more of the plurality of injectors 316 to penetrate the ground. In an embodiment, one or more of the plurality of injectors 316 are each aligned with a ground-disrupting blade such that the liquid is injected into a trench, which can then be covered as more fully described below.

Continuing to refer to FIG. 8, the hose boom 334 can be movably joined to the boom mount 338, such that the hose boom 334 can rotate about the primary boom mount axis 340, as indicated by the arrow 342. In addition, the hose boom 334 can be rotated about secondary boom mount axis 360 as indicated by the arrow 362. Thus, in addition to being pivotable generally parallel to the ground being traversed by the spreader unit 302 about primary boom mount axis 340, the hose boom 334 can be articulated about a secondary boom mount axis 360 at a proximal portion such that a distal portion of the hose boom 334 can be to be raised to a higher level than the proximal portion. Further, the hose boom 334 can have a telescoping portion that can have at least two telescoping components, such as a first telescoping portion 334A and a second telescoping portion 334B. The second telescoping portion 334B can be moved in the direction of arrow 366 to retract or extend the reach of the hose boom 334.

Figure 9:
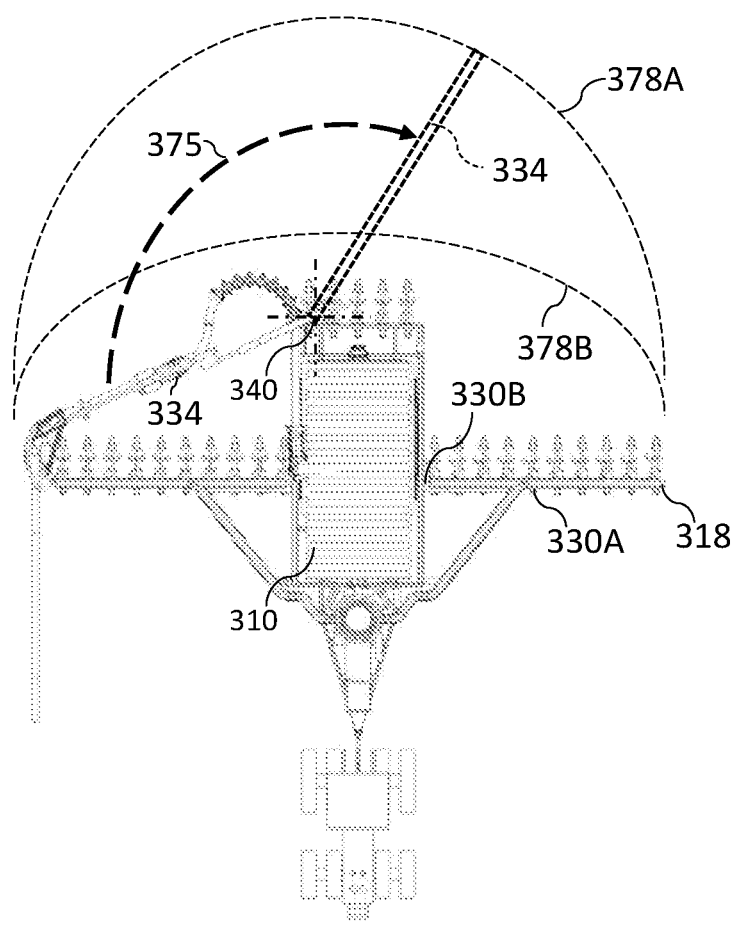
FIG. 9 is a plan view of a system and apparatus for liquid nutrient spreading.

A beneficial aspect of the liquid nutrient spreader system 300 having the hose boom 334 as described herein is that the "sweep area" of the moving hose boom is reduced, as indicated schematically in FIG. 9. A hose boom being pivotable about the primary boom mount axis 340, of the liquid nutrient spreader system 100 described above, sweeps as shown by arrow 375 to follow a generally circular path relative to the ground as it rotates about the axis 140, as indicated by imaginary line 378A. Thus, the area required for a pivot of the hose boom from one side of the liquid spreader to the other is equal to at least to the area of a portion of a circle having a radius the length of the hose boom 334. However, the hose boom 334 can be raised and pivoted, thus effectively reducing the "sweep area" associated with a pivot of the hose boom from one side of the liquid spreader to the other, as indicated by the area circumscribed by the imaginary line 378B. At the end of a field being treated there may be trees, power lines, or other obstructions. Having a hose boom articulable upwardly reduces the sweep area needed to pivot the hose boom from one side of the liquid spreader to the other, thereby permitting the liquid nutrient spreader system 300 to treat a field more A beneficial aspect of the liquid nutrient spreader system 300 having the hose boom 334 as described herein relates to hose handling and placement and pickup from the ground. By extending and retracting the boom, the supply hose can be placed in any given row of growing crops in the field without changing the boom rotation. The telescoping boom can also be utilized as a hose accumulator to assist the reel during the center-of-field transitions. As the hose reel switches rotation direction to go from reeling hose in to reeling hose out, for example, the boom can extend to take up extra hose, and retract to release hose. With the boom retracted, it also makes transport easier.

Figure 10:
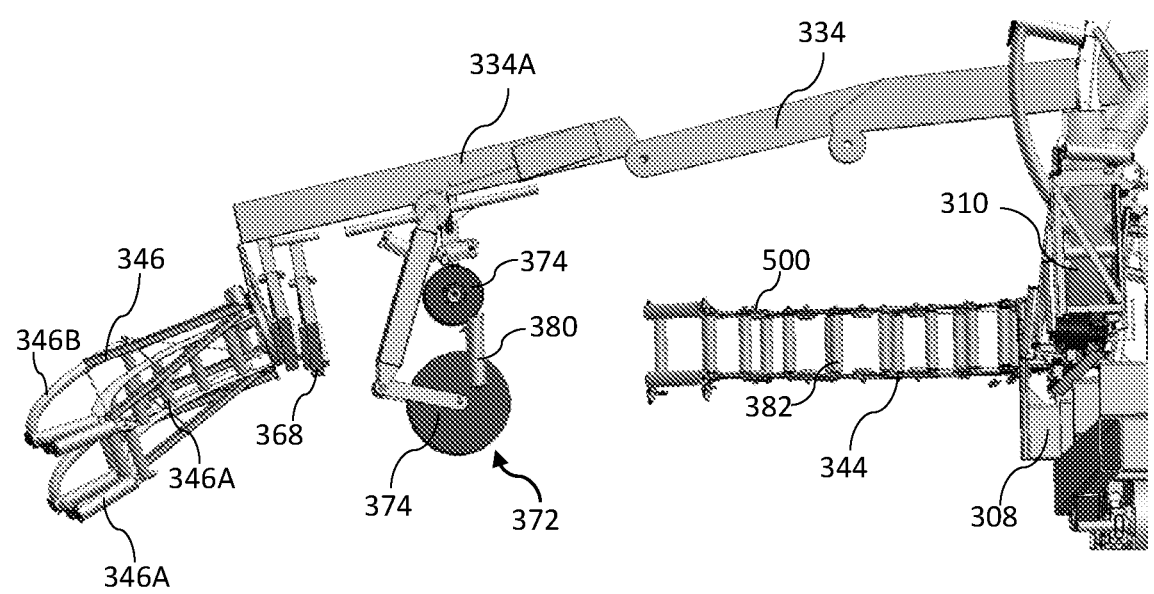
FIG. 10 is a side elevation view of certain components of a system and apparatus for liquid nutrient spreading.
Figure 10A:
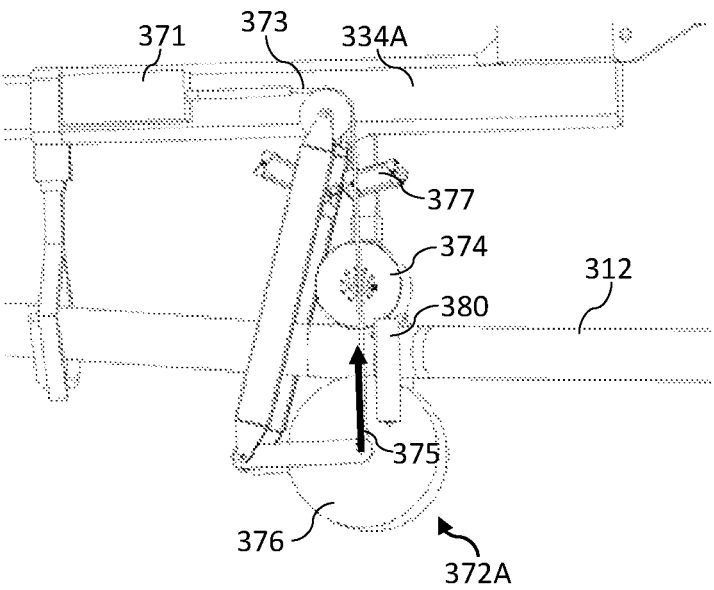
FIG. 10A is a side elevation view of a hose lay assist drive unit.

Continuing to refer to FIG. 8, and with reference to FIG. 10, certain additional features of the liquid nutrient spreader system 300 described. The supply hose 312 is guided through the hose boom 334 to or from the hose reel 310 through a series of flexible guides and one or more guide rollers. For example, the supply hose 312 can be exit the hose reel 110 via a hose reel winding guide 348 that redirects the supply hose 312 toward a second supply hose guide 344 that can be rotatably joined to the frame 308 or at or near the boom mount 338. The second supply hose guide 344 can be disposed at or near a proximal portion of the hose boom 334 and is flexible and articulable but prevents the supply hose from curving beyond a minimum radius of curvature, which can be determined for the supply hose utilized. Further, a first supply hose guide 346 can be disposed at a distal end of the hose boom 334 and provide for controlled curvature of the supply hose 312 as it enters or exits the hose boom 334. Additionally, a generally ring-like hose guide 368 can be operatively joined to each of the first telescoping portion 334A and a second telescoping portion 334B to provide for supply hose 312 guidance and stability. A guide roller assembly 372 through which the supply hose 312 can pass can be joined to the hose boom 334. The guide roller assembly 372 can include one or more guide rollers 374, one or both of which can be motor-driven in synchronization with the reeling or unreeling of the aid in moving the hose reel 110 to aid in better supply hose 312 control during reeling and unreeling operations. Thus, in an embodiment, the guide roller assembly 372 can be, or include, a hose lay assist drive unit 372A as detailed more fully in FIG. 10A below.

Figure 11:
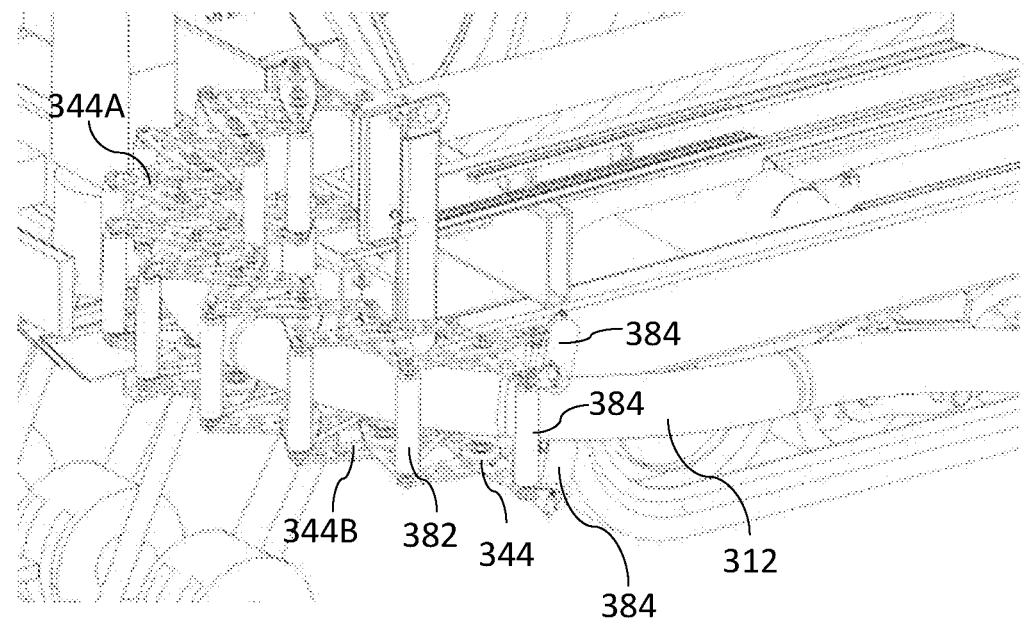
FIG. 11 is a perspective view of a portion of a system and apparatus for liquid nutrient spreading.
Figure 12:
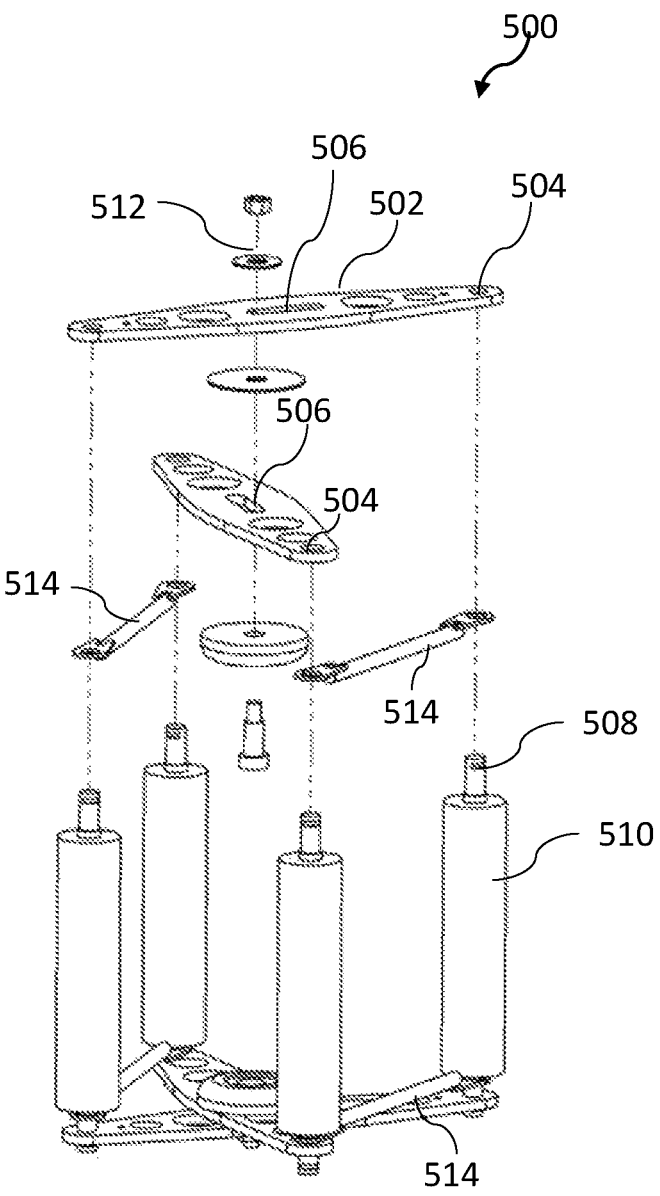
FIG. 12 is a perspective view of a link assembly.

Certain of the various features described above are shown in more detail in FIG. 10, in which the supply hose 312 is removed for better clarity. As shown the second telescoping portion 334B is retracted into first telescoping portion 334A. The second supply hose guide 344 is disposed at or near a proximal portion of the hose boom 334, including being joined to the frame 308 on or near the boom mount 338. The second supply hose guide 344 can be constructed as shown in FIGS. 11 and 12, in which articulating link assemblies 500 permit flexibility in a plane to allow the supply hose 312 can be guided into a controlled curvature. For example, a first linkage 344A of joined articulating link assemblies 500 can be joined in a generally parallel and separated relationship with a second linkage 344B of articulating link assemblies 500 by separation links 382, one, some, or all of which can include a roller that permits smooth movement of the supply hose 312 inside the second supply hose guide 344. Additionally, exit rollers 384 can be mounted at an exit portion of the first supply hose guide 344 to permit generally smooth exit movement of the supply hose when entering or exiting the second supply hose guide 344.

Figure 11A:
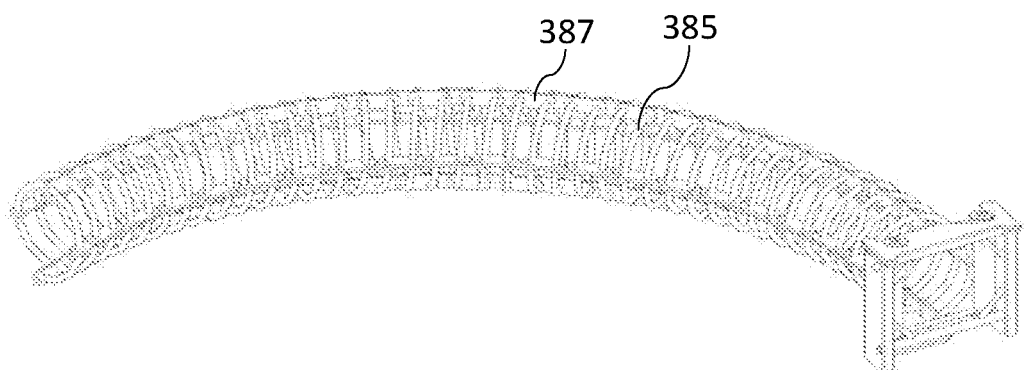
FIG. 11A is a perspective view of a supply hose guide.

In an embodiment, one or both of the second supply hose guide 344 and the first supply hose guide 346 can be a configuration, such as the tubular coil 345 as shown in FIG. 11A. The tubular coil 345 can be a spring-like structure having a sufficient inside diameter to permit free movement of the supply hose 312. The coils can be steel coils having sufficient stiffness to be linked by links 387 that permit limited contraction and extension between coils of the tubular coil 345. The links 387 can be loosely joined at portions of the coils two allow the limited contraction and extension, and to permit bending of the tubular coil 345 to a predetermined minimum radius of curvature.

Referring to FIG. 12, an articulating link assembly 500 can include various components that, when joined, provide for movement allowing the supply hose 312 to curve, together with mechanical stops that prevent the supply hose 312 from exceeding a minimum radius of curvature, as determined by the size and material of the hose. The articulating link assembly 500, when joined together with other articulating link assemblies 500 into the first supply hose guide 344 allows freedom of movement within a minimum radius in at least two directions in a of curvature. For example, a series of metal bars 502, each with a hole 504 at each end and a slot 506 in the middle can be joined in a general X-shape. The metal bars 502 can be joined with a bolt arrangement 512, or similar, in the slot. An upper and lower series of X-shape metal bars can be connected at the respective holes 504 by being attached at respective ends of a shaft 508. A roller 510 can be mounted on each shaft 508. First supply hose guide 344 is angled into a curved configuration, the distance from the end of articulating link assembly 500 to the bolt in the slot changes which allows the articulating link assembly 500 facilitate a curve to the first supply hose guide 344. When the bolt is at the end of its slot, the minimum radius of curvature for the first supply hose guide 344 will be reached. Cross connectors 514 can make lateral connections between corresponding upper and lower ends of the shafts 508. In an embodiment, the cross connectors can be equipped with rolling members such as a roller to aid in smooth hose movement through the first supply hose guide 344. In an embodiment, the structure of the first supply hose guide 344 can be utilized as the second supply hose guide 346 or any other hose guide.

Referring again to FIG. 10, the second supply hose guide 346 can be rotatably mounted to the distal end of the hose boom 334, and can include an arrangement of rollers 346A and guide bars 346B sufficient to ensure the generally smooth entry or exit of the supply hose 312 as it traverses the distal portion of the hose boom 334. Disposed intermediate to the first supply hose guide 344 and the second supply hose guide 346 can be the guide roller assembly 372, which is described in FIG. 10A as the hose lay assist drive unit 372A. The hose lay assist drive unit 372A can be joined to the hose boom 334 and positioned such that the supply hose 312 can pass through it. The hose lay assist drive unit 372A can both guide the supply hose 312 and drive the supply hose 312 in one or both directions to aid entering or exiting the distal portion of the hose boom 334. Various hydraulic, pneumatic, electrical, servo-driven, robotic, or other positioning linkages 380 can be employed to provide for sufficient positioning and/or frictional engagement between the guide rollers and the supply hose. As shown, two wheels or rollers can be disposed in a spaced relationship on opposing sides of the supply hose 312 and can be engaged in frictional contact such that when one or both wheels are driven in a rotating manner, a driving force is applied to the supply hose 312. For example, guide roller 374 can be a powered, driven solid or pneumatic wheel. Similarly, guide roller 376 can be an idler roller or a driven roller and can have a resilient, cushioned surface that permits hose couplers, hose menders, and the like to pass between the guide rollers. Further, positioning linkage 380 can be a roller to aid in positioning the supply hose 312 during passage through the hose lay assist drive unit 372A. A cable 373 can be joined at one end to a portion of the linkage connecting the guide roller 376 and joined at the other end to an adjustable, moveable mechanism such as a pneumatic cylinder that can, via pulleys if necessary, supply an engaging force in the direction of arrow 375 to draw the guide rollers toward one another and to provide for sufficient pressure between the guide rollers onto the supply hose 312. An opposite effect can occur upon release of the tension provided in the cable 373. Further, in an embodiment, swing cylinders 377 can assist in permitting some movement of the various components, including permitting swing movement and assisting in disruptions such as hose couplers and hose menders passing through.

Figure 13:
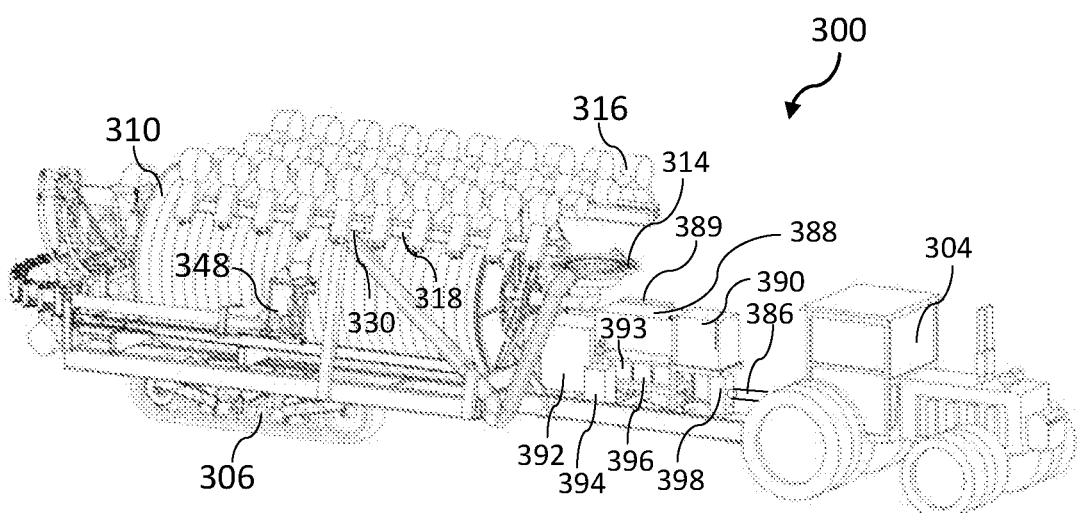
FIG. 13 is a perspective view of a system and apparatus for liquid nutrient spreading.

Referring now to FIG. 13, there is shown the liquid nutrient spreader system 300 configured for transport. As shown, the toolbar 318 has various portions and linkages to facilitate pivotable and rotatable portions to fold the plurality of injectors 316 to the side and above the hose reel 310. In an embodiment, the hose reel 310 is powered by a hose reel motor and/or powered from the power take off 386 of the mover 304, with rotation being controlled to reel in or reel out the supply hose 312 with movement of the spreader unit during operation. Other components that can be beneficially included with the liquid nutrient spreader system 300 include A gearbox 398 for increasing the speed of rotation from the power take off 386, an air compressor 390, a hydraulic oil reservoir 388, an electrical cabinet 389, one or more hydraulic pumps 396, hydraulic case drain oil tank 394, and an auxiliary power engine or capacitor bank 392 for power to the various powered components. The incorporation toolbar 318 can be comprised of moveable sections, each section being articulated about one or more toolbar joints 330, two of which are indicated in FIG. 9 as 330A and 330B and one of which is indicated in FIG. 12 for one of the lateral extensions of the incorporation toolbar 318. Referring to FIG. 9, in one embodiment, the incorporation toolbar 318 can first swivel while remaining generally parallel to the ground about toolbar joint 330A, and then the rotated generally upwardly about toolbar joint 330B (toward the viewer as depicted in FIG. 9) such that the incorporation toolbar 118 is raised toward the top of the hose reel 310 for transport. The number and placement of toolbar joints 330 can permit the toolbar sections to be folded, rotated, or otherwise manipulated to minimize the outward extension of the incorporation toolbar 318 during transport of the spreader unit 302.

It is noted that the mid-mount configuration of the incorporation toolbars 318 as indicated in FIGS. 2 and 9, can be beneficial for use of the apparatus and system. In particular, it is believed that locating the proximal end of the incorporation toolbars 318 within about two to three feet of a central track 106 location provides for improved weight distribution, improved engagement of the injectors with the ground, and improved stability of the spreader as it operates.

In an embodiment, the system can include a generator 393 that can be powered by its own engine, by the tractor PTO 386 either directly, or through the speed increaser and/or hydraulic pumps to generate electrical power. This electricity could be sent to the capacitor bank 392 to store for future use, or sent directly to a motor for conversion to mechanical energy. In one embodiment, the electric-powered motors could be attached to drivers for the tracks 306. In this way, changes in necessary power can be supplied by the electric power augmenting, or replacing, other forms of power. For example, if a wet spot a field being treated was encountered, the controls in the electrical cabinet 389 could enable the electric power to be delivered to the tracks to assist in propulsion through the tough spot. In another embodiment, the hose reel 310 could be powered by an electric motor. During center-of-field and/or end-of-field maneuvers, the capacitor bank could provide the extra power needed to reverse the reel direction in a quick and efficient manner. Using an electrical system versus a hydraulic system for these uses could prove more energy efficient with less losses to heat and internal leakage. Electrical power also has less efficiency losses than hydraulic when running low demand loads which will be very regularly on the nutrient spreader.

Figure 14:
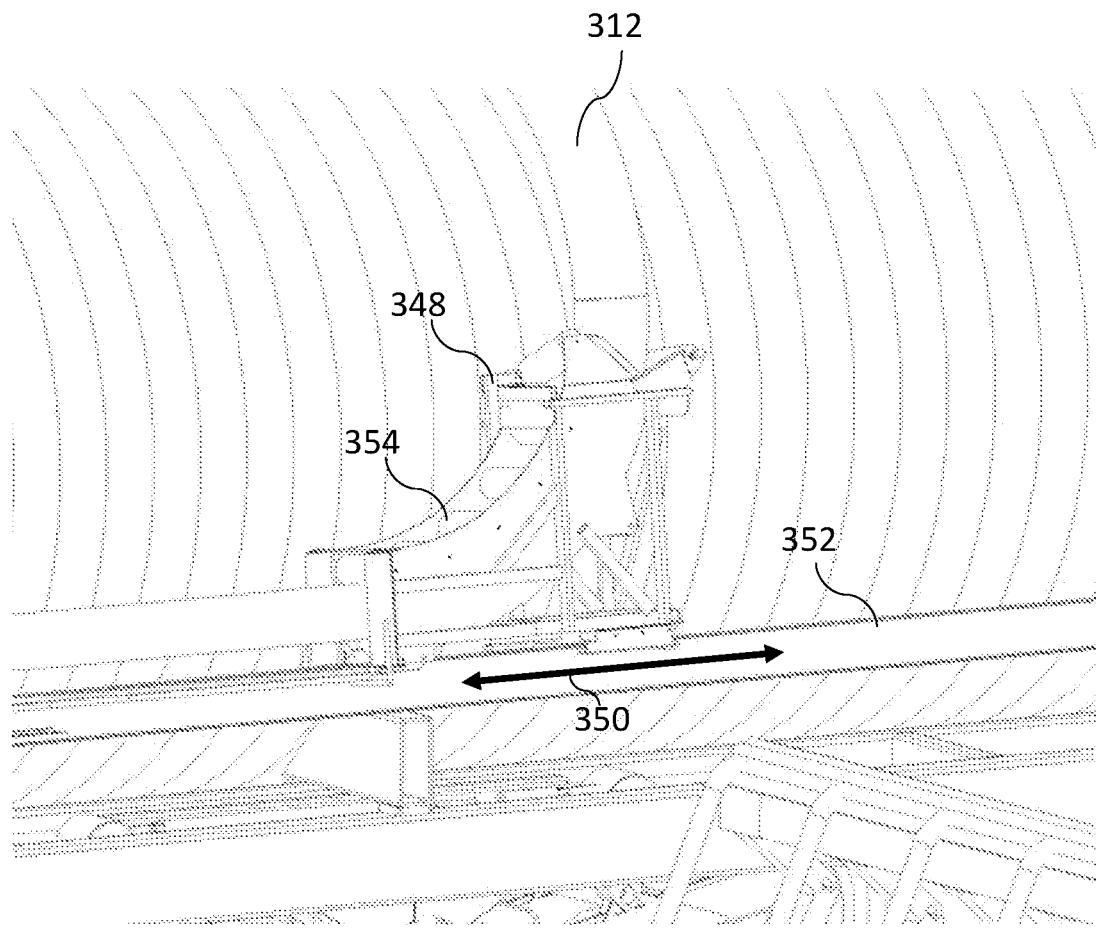
FIG. 14 is a perspective view of a portion of a system and apparatus for liquid nutrient spreading.

Referring now to FIG. 14 there is shown in more detail the hose reel winding guide 348. The hose reel winding guide 348 can translate generally in a linear back and forth direction as indicated by arrow 350 by being moveably mounted onto a winding guide track 352. The hose reel winding guide 348 has a plurality of rollers 354 positioned to provide for rolling contact with the supply hose 312 as it enters, traverses, and exits the hose reel winding guide 348. The rollers 354 of the hose reel winding guide 348 are arranged to provide for a curved path for the supply hose 312 that prevents curving beyond a minimum radius of curvature and such that the supply hose 312 makes substantially a 90 degree turn from the hose reel 310 to a direction generally parallel to a mounting surface of the winding guide track 352.

As indicated in FIGS. 8 and 9, boom mount 338 can be mounted in a position offset from a central area of the frame 308. For example, the boom mount 338 can be mounted a distance to one side of the frame 308 and separated a distance from, for example, the reel axis 320. As depicted in FIG. 8, for example, the offset configuration of the boom mount 338 to be in generally linear alignment with the hose reel winding guide 348 can facilitate efficient supply hose routing to the hose reel winding guide 348. The hose boom 334, the boom mount 338, and other portions of the frame 308 can have various rollers, guides, hooks, loops, and the like for guiding, managing, and generally handling the supply hose 312 during operation of the spreader unit 302.

In like manner as described above with respect to the liquid nutrient spreader system 200 shown in FIG. 2, supply hose 312 can be wound about the hose reel 310 and connected to a swivel joint that connects to a fluid tube that extends interior to the hose reel 310 that and extends to a fluid distributor 314. The fluid tube can be a non-rotating, fixed tube, fixed to the frame 308. The fluid distributor 314 includes a connection to the fluid tube and a plurality of injector hose connections 326. An injector hose 328 connects the injector hose connection 326 to an injector 316. In operation a plurality of injector hoses 328 connect one or more of the injector hose connections 326 to one or more injectors 316. Thus, in operation, liquid nutrients can flow from the supply hose 312 to the fluid distributor 314, and through one or more injector hoses 328 to one or more injectors 316, and then into the ground.

The hose reel 310 can be adjustably moveable up and down, in like manner as described by the arrow 260 in FIG. 2. Vertical up or down movement of the hose reel 310 can be effectuated by, for example, a hydraulic piston member mounted to a portion of the frame 308. Thus, the frame 308 can have a size and shape to accommodate a portion of the hose reel 310 in a lowered position, which is advantageous for lowering the overall height of the spreader unit 302 for transport. However, during operation, the hose reel 310 can be elevated to an operational level. In an embodiment, in a lowered position, the highest portion of the hose reel 310 can be less than 13 feet, six inches. In an embodiment, in a raised position, the highest portion of the hose reel 310 can be about 16 feet from the ground, thereby providing room for the tracks and winding guide to work more properly.

Additionally, to the disclosure above, the hose boom can be made of tubes with sequentially smaller diameters that are able to be slide inside one another to allow telescoping motion. The entire hose boom can also pivot around an axis giving rotation to allow it to swing from side to side, and thereby to one end or the other of the incorporation toolbar. While driving, the supply hose can dispense off of the reel and down the telescoping boom rotated to either the far left, or the far right of the incorporation toolbar that is attached to the supply unit. The hose boom can be offset from center to be placed closer to the hose reel winding guide. The hose reel winding guide can be hinged so that it "leans" toward or away from the hose real to self-align with whatever wrap layer is currently being spooled, or un-spooled from the hose reel. By positioning the hose reel winding guide substantially upright, it takes up a small amount of horizontal space to maintain as narrow as possible of a profile for road transport, without the added complexity of folding it.

Figure 15:
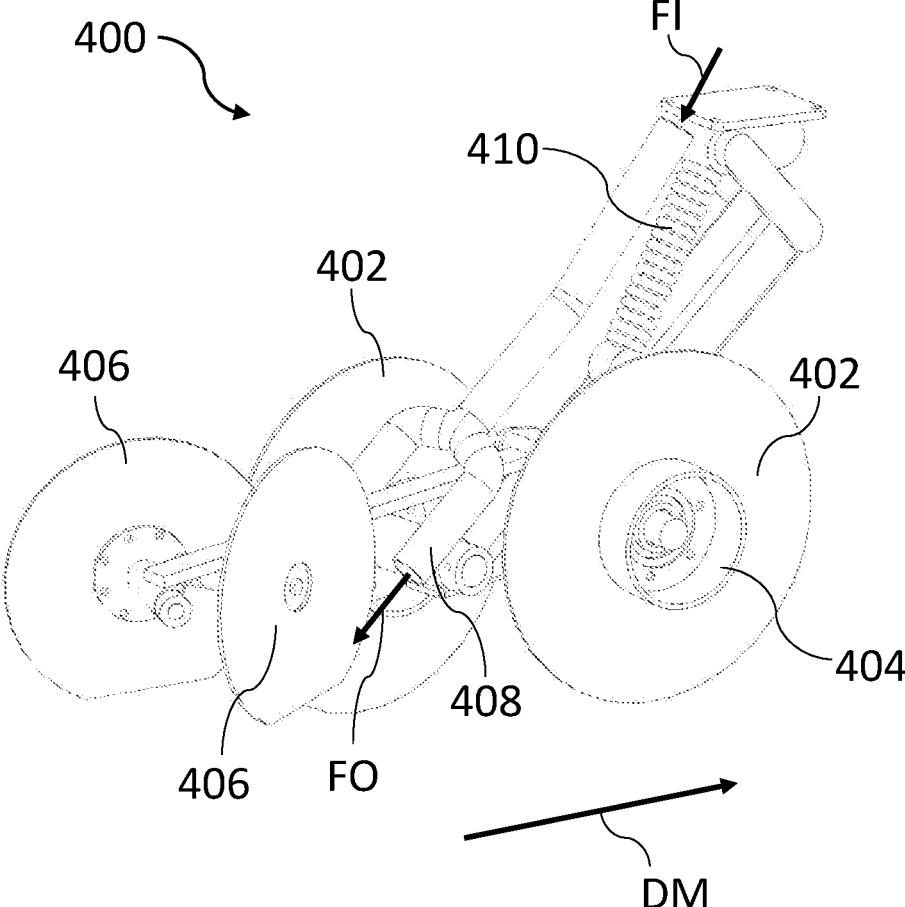
FIG. 15 is a perspective view of an example injector of the present disclosure.
Figure 16:
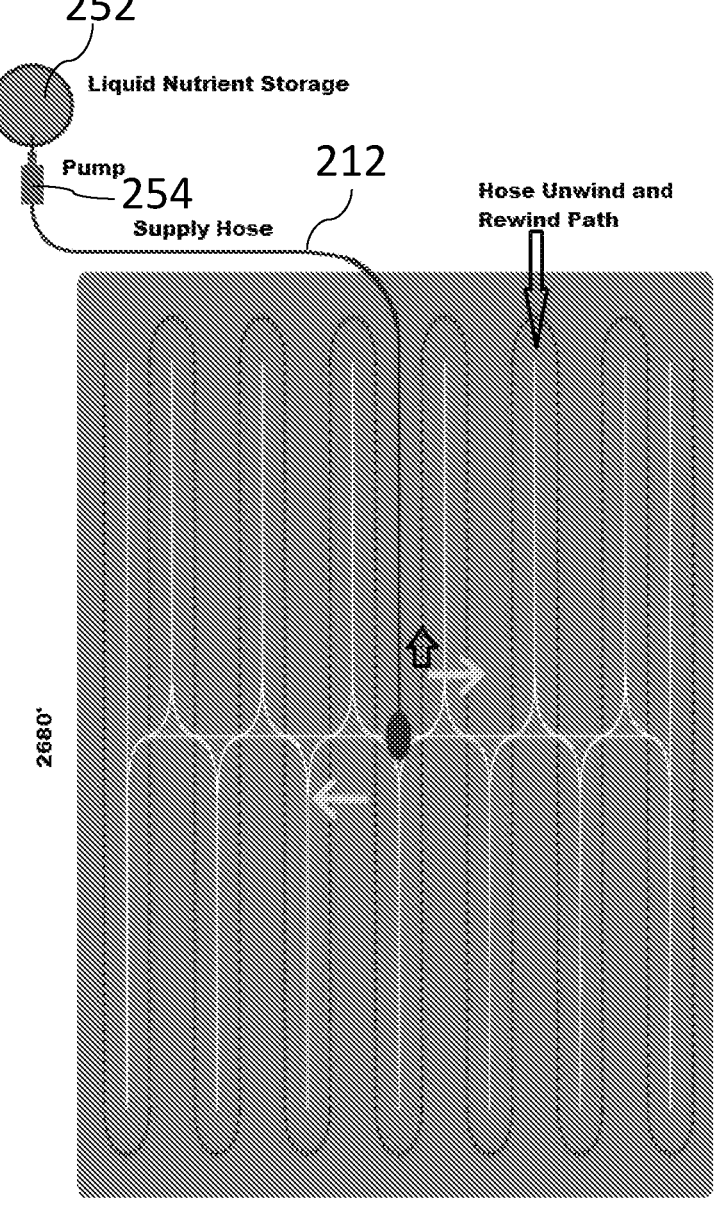
FIG. 16 is a schematic plan view of a method for liquid nutrient spreading.

Referring now to FIG. 15 there is shown an example injector 400, which can be injector 116 or injector 216 or injector 316, as discussed above. Liquid nutrients flow in the direction of the fluid inflow arrow FI into the injector 400 and is ejected onto and/or into the ground at the fluid outflow arrow FO, and can be precisely place by, for example, drop tubes 408. A pair of oppositely disposed trenching discs 402, which can be wavy discs, referred to herein as "coulters" can be pressed into the ground a distance to make a slot, groove, or trench into which fluid will be injected. A coil spring or hydraulic cylinder 410 can aid in keeping the trenching discs 402 at a desired depth. The trenching discs 402 can be set at an angle, such as, for example, a 4 degree angle to horizontal to make a trench into which the liquid nutrient can be deposited. An outwardly extending cylindrical protrusion 404 can extend from one or both of the trenching discs 402 to serve as a depth limiting member. The diameter of the cylindrical protrusion 404 can be varied as desired for the desired depth of trenching by the trenching discs 402. A pair of oppositely disposed closing discs 406, which can also be termed "coulters," can be set and angled to push dirt back over the trench, thereby closing the trench over the deposited liquid nutrient.

In an embodiment, the injector can be a Bazooka style injector, available from Bazooka Farmstar. In an embodiment, the fluid distributor, such as fluid distributor 314, can be a DosiMat DMX distributor available from Vogelsang US, Ravenna, Ohio. In an embodiment, the supply hose, such as supply hose 312, can be a hose from Kuriyama, such as Kuriyama Tigerflex 8 inch polyurethane fabric enforced hose, available from the John M. Ellsworth Company, Inc. Milwaukee, Wisconsin. In an embodiment, the injector hose, such as injector hose 328, can be a rubber (EPDM) hose with a polyethylene helix, available from The Hose Guru, Fort Wayne, Indiana. Other components can be obtained from commercial outlets, as desired. All connections between components can be achieved by means known in the art by those skilled in the art.

An example method for use of liquid nutrient systems described herein is shown in FIG. 15. In operation, the mover 104, 204, or 304 can pull the spreader unit, 102, 202, or 302 along the path indicated by dashed lines in FIG. 15, while the supply hose, 112, 212, or 312 is spooled or unspooled, depending on the movement direction DM. Application of liquid nutrient can be achieved by starting in the middle of a field and working to the right, and then return to the center and work to the left or vice-versa (left and right being understood with reference to the orientation of a representative field in FIG. 16). Smaller or irregular shaped fields may be set up with a different starting point than that shown.

Further to describing the apparatus, system, and method, it can be understood from the above description that the apparatus, system, and method allows users to apply liquid manure and/or liquid nutrients (fertilizer) to parallel rows of growing crops at high rate of flow. It can be dual purposed and also used for high rate of flow application after the crops have been harvested in the fall as well. The hose reel mounted over a track system distributes the weight of the unit over a larger area and decreases the pressure exerted on the ground. The track system can also have propulsion assistance to aid in moving the apparatus through poor ground conditions. The hose reel is able to be raised to a "field" position during use in the field, and lowered down to "transport" position for travel on roads to be within legal road height. The vertical winding guide traverses back and forth across the side of the hose reel to aid in smoothly spooling and un-spooling the hose on and off the hose reel. The hose reel will dispense hose off the reel, through the vertical winding guide, then down a telescoping boom rotated to either the far left, or the far right of the incorporation toolbar that is attached to the frame. The boom rotation axis is offset from frame center to be placed closer to the vertical winding guide. The hose can be laid out on the ground (or wound up from the ground) at the same speed at which the tractor is pulling the spreader unit. The boom can be rotated to either side of the spreader unit, but the hose is to be laid on the same side of the spreader unit as the direction you are intending to turn at the end of the field. When the end of the field has been reached, the tractor operator will initiate the turn to begin traveling back towards the middle of the field while reeling the hose back up onto the hose reel. Upon passing the center of the field, the boom will rotate dispensing hose onto the ground perpendicular to the direction of travel until the boom has reached the other extremity of the incorporation toolbar. The operator will then continue on to the other end of the field while dispensing out hose. Upon reaching the end, the operator will again turn around and begin reeling in the hose until passing the center of the field. This operation will continue across the field until the entire field has been covered with liquid nutrients. The telescopic rotating boom can allow the apparatus to cover up to four times as many acres of standing crop in one hose setup than with the same amount of hose on a stationary boom model. By needing less hose to do more acres, the system can utilize a larger hose. This will take up the same space on a reel but allow much more flow, greatly increasing productivity and efficiency. By using an articulable incorporation toolbar, for example allowing folding of the incorporation toolbar on an angled hinge, the incorporation toolbar can fold up with the folded sections stacked front to rear from each other. This allows a much narrower roadway travel width, while still allowing a tool bar width in excess of 80 feet.

Figure 17:
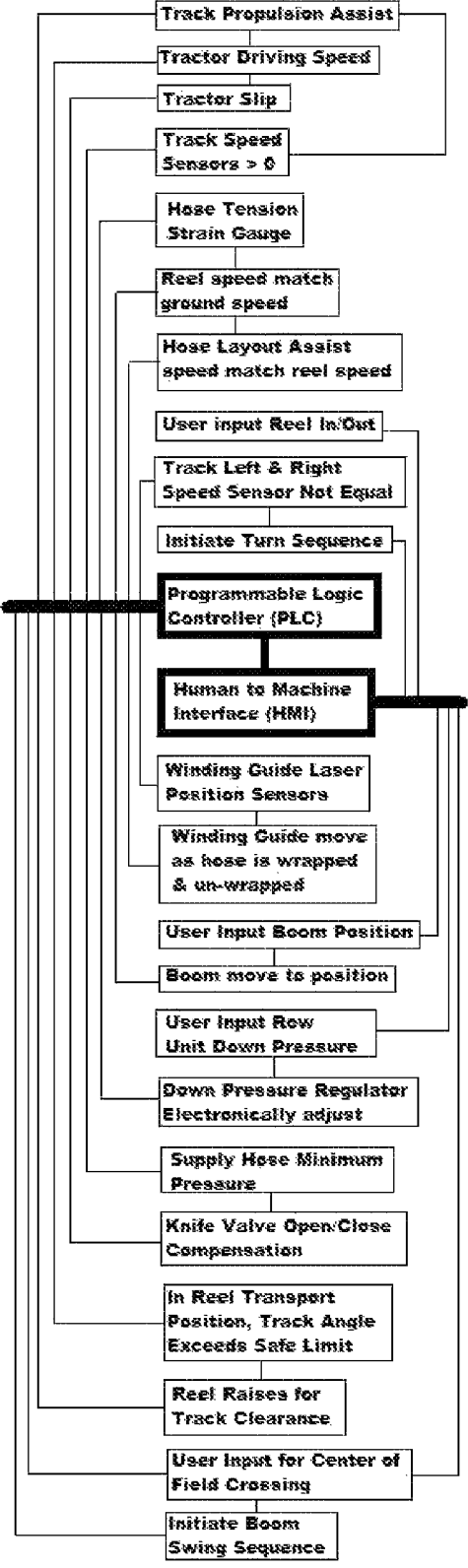
FIG. 17 is a schematic depicting representative controls for a system and apparatus for liquid nutrient spreading.

Various controls can be utilized in the apparatus and system of the present disclosure. FIG. 17 provides a representative schematic diagram for various control components, any or all of which may be incorporated in a system of the present disclosure. For example, hydraulic and electrical controls can include: left and right track speed sensors, reel speed sensor(s), reel hydraulic pressure sensor, winding guide position laser sensors, boom rotation position sensor, boom load sensor, boom telescopic position sensor, boom tip strain gauge, vertical winding guide strain gauge, track tilt angle sensor, and incorporation toolbar hydraulic down pressure sensor. The various controls can cooperate via a Programmable Logic Controller (PLC) with a Human to Machine Interface (HMI) touchscreen controller. All of this data from the sensors can feed into the PLC to determine how fast the operator is driving and how fast the reel needs to rotate to maintain the proper hose tension. It will monitor the left and right track speed to determine if the operator is initiating a turn to raise some of the inside toolbar incorporation units and shut off the liquid nutrient flow to these units. It will also know to speed up, slow down or reverse the rotation of the hose reel from this data. When the operator crosses the center of the field, he can press a button on the touch screen to initiate the rotation of the boom to the opposite extremity of the incorporation toolbar. During this operation, the hose reel will need to accelerate as fast as possible and then decelerate to driving speed again once the rotation is finished. This rotation desirably happens smoothly and quickly to lay the hose as close to perpendicular to the direction of travel as possible. If this happens too slowly while fertilizing parallel rows of growing crop, the hose may be drug across a growing crop, damaging and potentially killing the plant.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art.

Rather it is hereby intended the scope of the invention to be defined by the claims appended hereto.

What is claimed is:

1. A liquid nutrient spreader comprising:
   a frame;
   two tracks joined to the frame, each of the two tracks oriented on the frame in a parallel configuration and aligned in a first direction;
   a hose reel joined to the frame, the hose reel being generally cylindrical and having a central axis aligned generally parallel to the first direction, the hose reel being joined to a non-rotating fixed tube being affixed to the frame;
   a hose boom rotatably joined to the frame at a boom mount having a first boom mount axis, the hose boom being rotatable about the first boom mount axis;
   a first supply hose guide joined to a distal end of the hose boom;
   a hose reel motor operatively joined to the hose reel to rotate the hose reel about the central axis;
   an incorporation toolbar joined to the frame and extending away from the frame, the incorporation toolbar having mounted thereto a plurality of injectors;
   a fluid distributer joined to the non-rotating fixed tube, the fluid distributer having a plurality of injector hose connections and being configured for fluid communication between the non-rotating fixed tube and the plurality of injector hose connections; and
   a plurality of injector hoses, each of the plurality of injector hoses being joined on a first end to one of the plurality of injector hose connections and on a second end to one of the plurality of injectors.

2. The liquid nutrient spreader of claim 1, further comprising a hose reel guide, the hose reel guide mounted to the frame adjacent to the hose reel and being moveable in a direction parallel to the first direction.

3. The liquid nutrient spreader of claim 1, further comprising a hose reel guide, the hose reel guide mounted to the frame adjacent to the hose reel and being moveable in a direction parallel to the first direction, and further comprising a supply hose, wherein the supply hose is at least partially wrapped about a surface of the hose reel and joined at a swivel joint to the non-rotating fixed tube, the supply hose being at least partially disposed in the hose reel guide and at least one of the first supply hose guide and the second supply hose guide.

4. The liquid nutrient spreader of claim 1, wherein the hose boom comprises a telescoping boom segment.

5. The liquid nutrient spreader of claim 1, wherein the hose boom is rotatable about a second boom mount axis, the second boom mount axis being generally perpendicular to the first boom mount axis.

6. The liquid nutrient spreader of claim 1, further comprising a hose lay drive assist unit, the hose lay drive assist unit being joined to the hose boom and comprising opposing wheels joined to the hose lay drive assist unit in a spaced relationship, wherein at least one of the opposing wheels is powered to be driven rotationally.

7. The liquid nutrient spreader of claim 1, wherein the incorporation toolbar comprises at least two sections, the at least two sections being joined to and articulable about a joint.

8. A liquid nutrient spreader comprising:
   a frame;
   two tracks joined to the frame, each of the two tracks oriented on the frame in a parallel configuration and aligned in a first direction;

a hose reel joined to the frame, the hose reel being generally cylindrical and having a central axis aligned generally parallel to the first direction, the hose reel being joined to a non-rotating fixed tube being affixed to the frame;

a hose boom rotatably joined to the frame at a boom mount having a first boom mount axis, the hose boom being rotatable about a boom mount axis, and wherein the first boom mount axis is perpendicular to and non-intersecting with, the central axis;

a first supply hose guide joined to a distal end of the hose boom, the first supply hose guide having a plurality of rollers;

a second supply hose guide joined to the frame, the second supply hose guide being flexible to bend to a predetermined minimum radius of curvature;

a hose reel motor operatively joined to the hose reel to rotate the hose reel about the central axis;

a first incorporation toolbar joined to the frame and extending away from the frame on a first side of the frame, the first incorporation toolbar having mounted thereto a first plurality of injectors;

a second incorporation toolbar joined to the frame and extending away from the frame on a second side of the frame, the second incorporation toolbar having mounted thereto a second plurality of injectors;

a fluid distributer joined to the non-rotating fixed tube, the fluid distributer having a plurality of injector hose connections and being configured for fluid communication between the non-rotating fixed tube and the plurality of injector hose connections; and a plurality of injector hoses, each of the plurality of injector hoses being joined on a first end to one of the plurality of injector hose connections and on a second end to one of the first plurality of injectors and the second plurality of injectors.

9. The liquid nutrient spreader of claim 8, further comprising a hose reel guide, the hose reel guide mounted to the frame adjacent to the hose reel and being moveable in a direction parallel to the first direction.

10. The liquid nutrient spreader of claim 8, further comprising a hose reel guide, the hose reel guide mounted to the frame adjacent to the hose reel and being moveable in a direction parallel to the first direction, and further comprising a supply hose, wherein the supply hose at least partially wrapped about a surface of the hose reel, the supply hose being disposed in the hose reel guide and at least one of the first supply hose guide and the second supply hose guide.

11. The liquid nutrient spreader of claim 8, wherein the hose boom comprises a telescoping boom segment.

12. The liquid nutrient spreader of claim 8, wherein the hose boom is rotatable about a second boom mount axis, the second boom mount axis being generally perpendicular to the first boom mount axis.

13. The liquid nutrient spreader of claim 8, further comprising a hose lay drive assist unit, the hose lay drive assist unit being joined to the hose boom and comprising opposing wheels joined to the hose lay drive assist unit in a spaced relationship, wherein at least one of the opposing wheels is powered to be driven rotationally.

14. The liquid nutrient spreader of claim 8, wherein the first incorporation toolbar comprises at least two sections, the at least two sections being joined to and articulable about a joint.

15. A liquid nutrient spreader system, the liquid nutrient spreader system comprising:

a liquid nutrient spreader comprising
a frame;

two tracks joined to the frame, each of the two tracks oriented on the frame in a parallel configuration and aligned in a first direction;

a hose reel joined to the frame, the hose reel being generally cylindrical and having a central axis aligned generally parallel to the first direction, the hose reel being joined to a non-rotating fixed tube being affixed to the frame;

a hose boom rotatably joined to the frame at a boom mount having a first boom mount axis, the hose boom being rotatable about the first boom mount axis;

a first supply hose guide joined to a distal end of the hose boom;

a second supply hose guide joined to the frame;

a hose reel motor operatively joined to the hose reel to rotate the hose reel about the central axis;

an incorporation toolbar joined to the frame and extending away from the frame, the incorporation toolbar having mounted thereto a plurality of injectors;

a fluid distributer joined to the non-rotating fixed tube, the fluid distributer having a plurality of injector hose connections and being configured for fluid communication between the non-rotating fixed tube and the plurality of injector hose connections;

a plurality of injector hoses, each of the plurality of injector hoses being joined on a first end to one of the plurality of injector hose connections and on a second end to one of the plurality of injectors;

a supply hose at least partially wrapped about a surface of the hose reel and joined at a swivel joint to the non-rotating fixed tube;

a liquid nutrient storage unit comprising liquid nutrients; and a pump operatively joined to the supply hose and associated in operable relationship to the liquid nutrient storage unit to transfer the liquid nutrients from the liquid nutrient storage unit through the supply hose to the at least one of the plurality of injectors.

16. The liquid nutrient spreader system of claim 15, wherein the hose boom comprises a telescoping boom segment.

17. The liquid nutrient spreader system of claim 15, wherein the hose boom is rotatable about a second boom mount axis, the second boom mount axis being generally perpendicular to the first boom mount axis.

18. The liquid nutrient spreader system of claim 15, further comprising a hose lay drive assist unit, the hose lay drive assist unit being joined to the hose boom and comprising opposing wheels joined to the hose lay drive assist unit in a spaced relationship, wherein at least one of the opposing wheels is powered to be driven rotationally.

19. The liquid nutrient spreader system of claim 15, wherein the incorporation toolbar comprises at least two sections, the at least two sections being joined to and articulable about a joint.

20. The liquid nutrient spreader system of claim 15, further comprising a tractor joined to the frame.

* * * * *